Sept. 22, 1970  M. VITALONI  3,530,266
SWITCHING CONTROL APPARATUS FOR VEHICLE DIRECTION INDICATORS
AND MAIN LIGHTS WITH OSCILLATORY DISC CONTACTS
Filed May 31, 1968                                      26 Sheets-Sheet 1

Sept. 22, 1970  M. VITALONI  3,530,266
SWITCHING CONTROL APPARATUS FOR VEHICLE DIRECTION INDICATORS
AND MAIN LIGHTS WITH OSCILLATORY DISC CONTACTS
Filed May 31, 1968
26 Sheets-Sheet 3

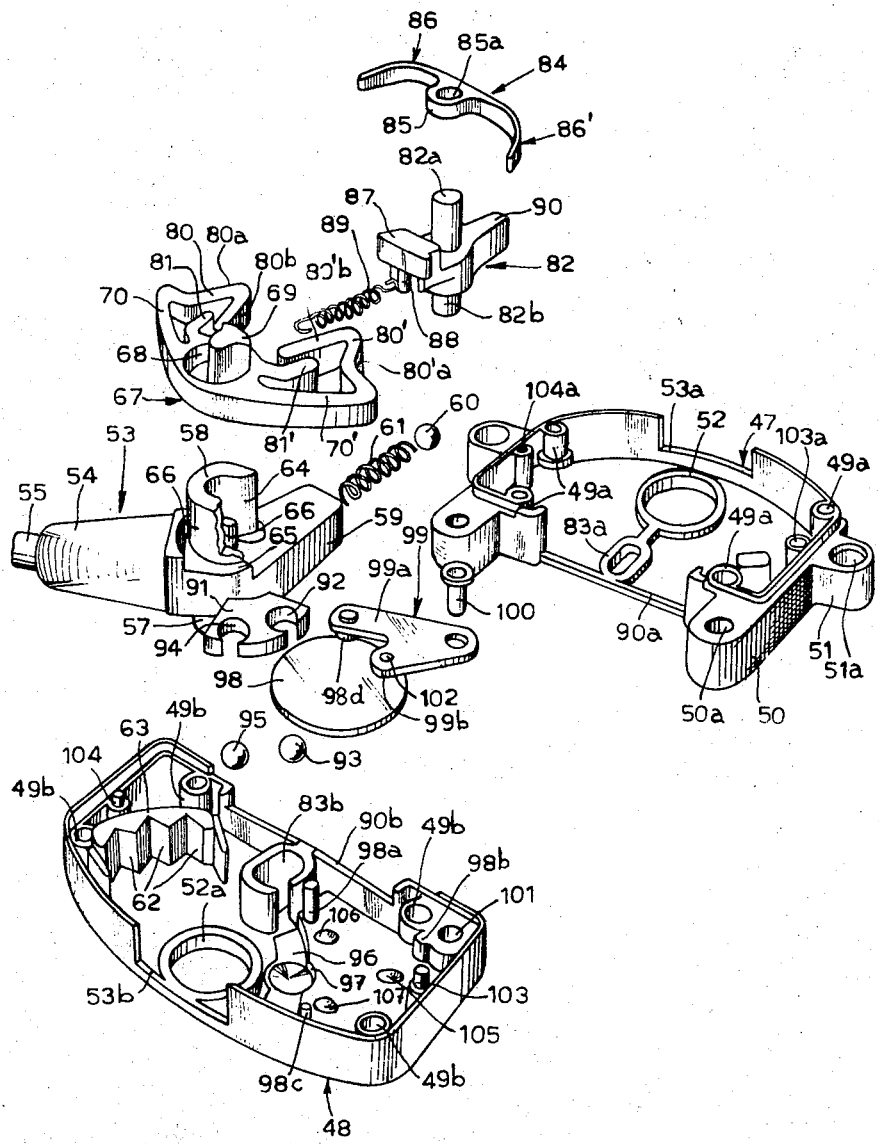

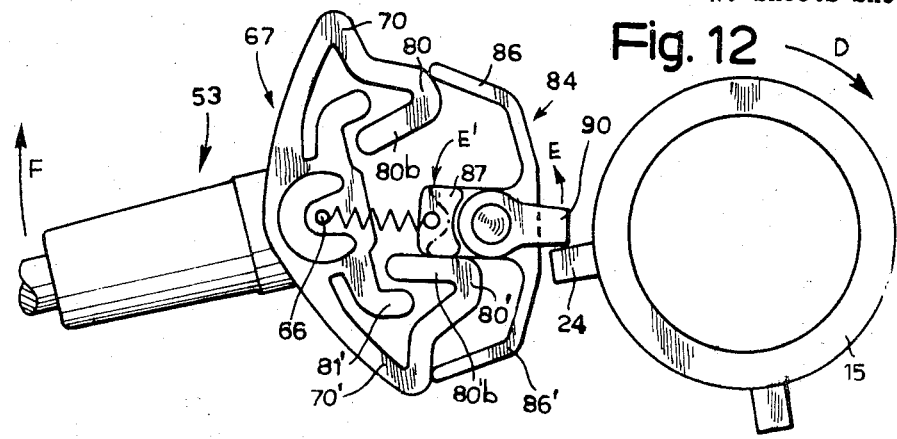
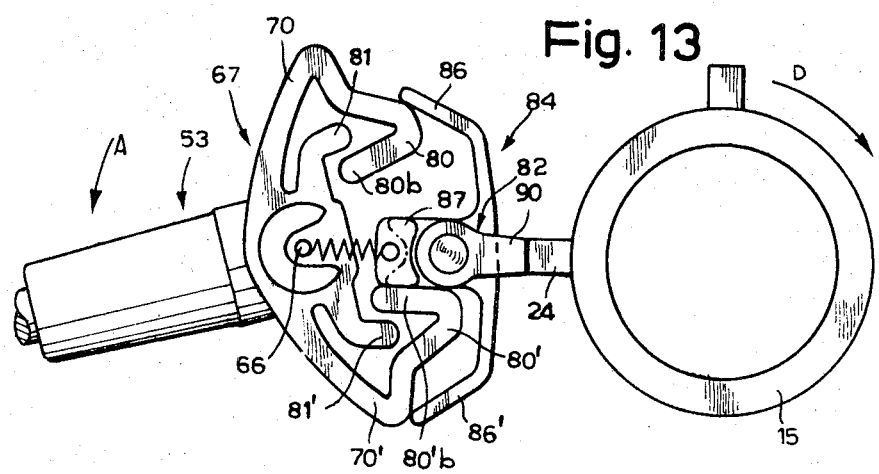
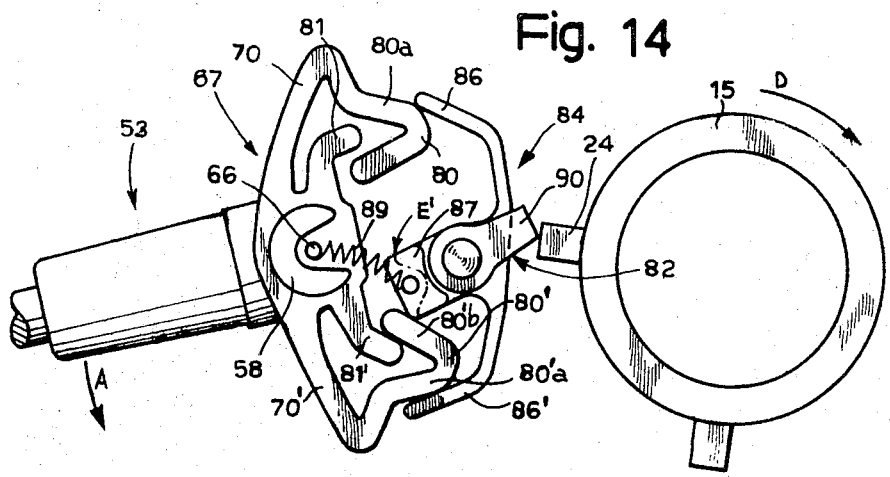

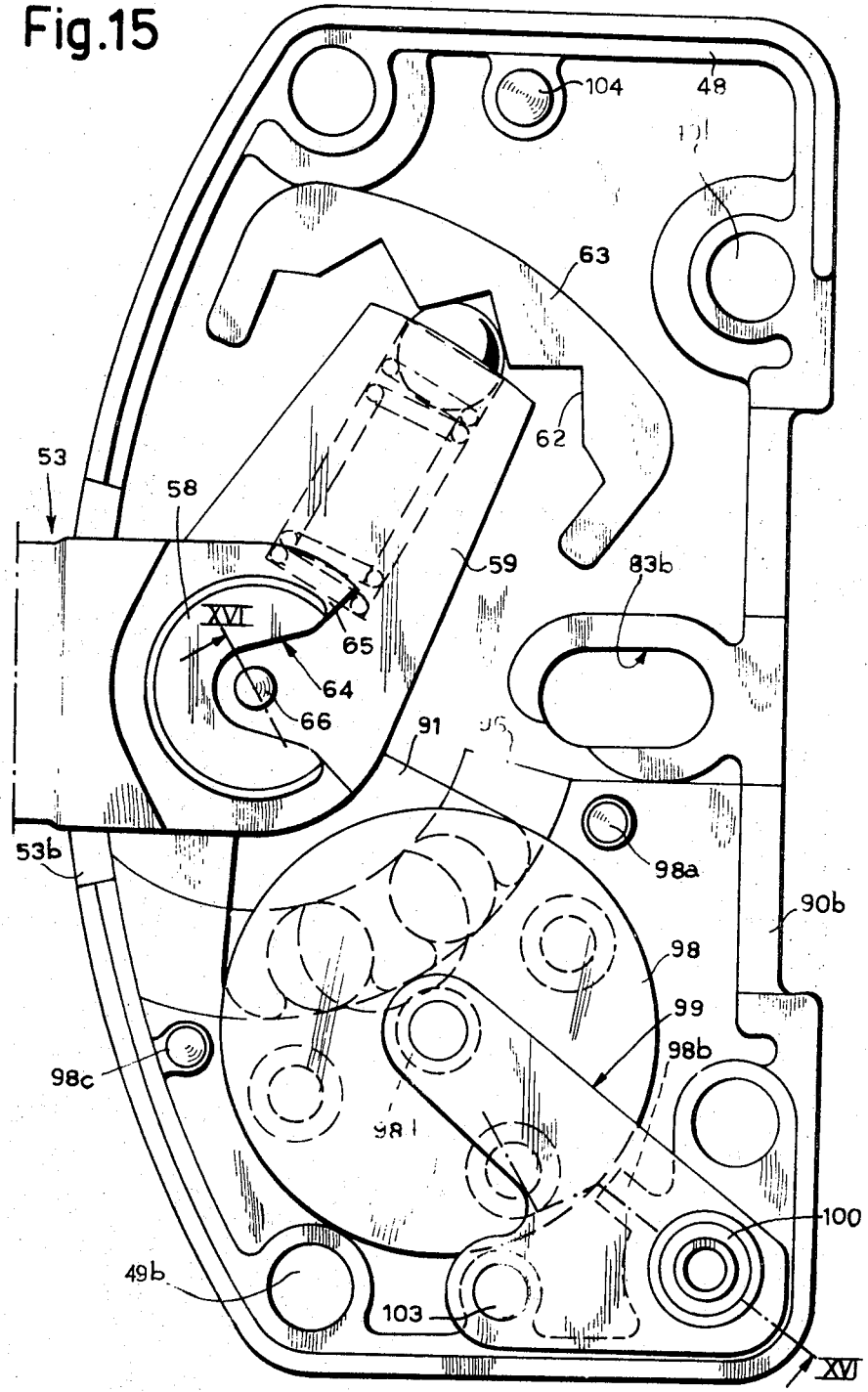

Sept. 22, 1970  M. VITALONI  3,530,266
SWITCHING CONTROL APPARATUS FOR VEHICLE DIRECTION INDICATORS
AND MAIN LIGHTS WITH OSCILLATORY DISC CONTACTS
Filed May 31, 1968  26 Sheets-Sheet 12

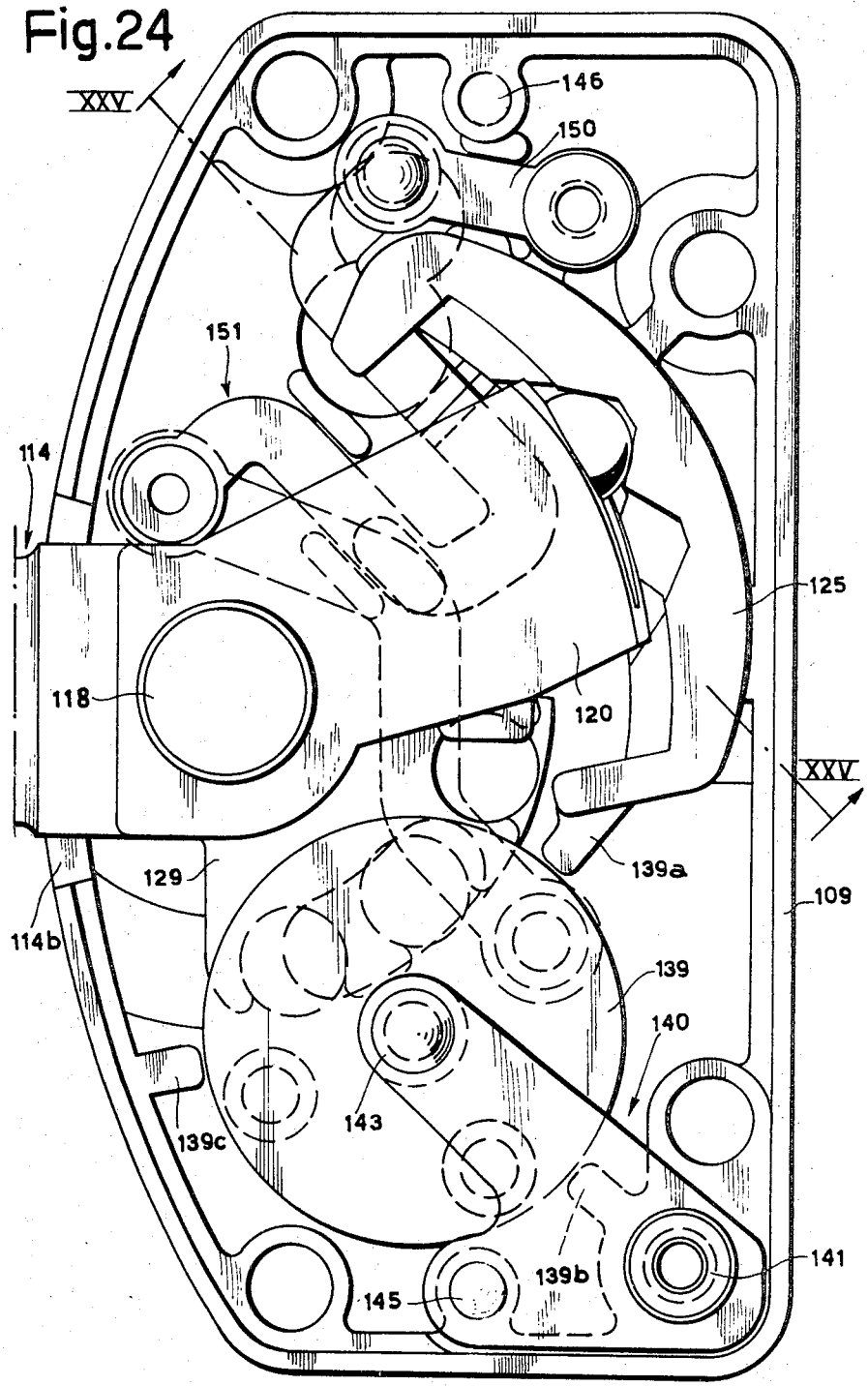

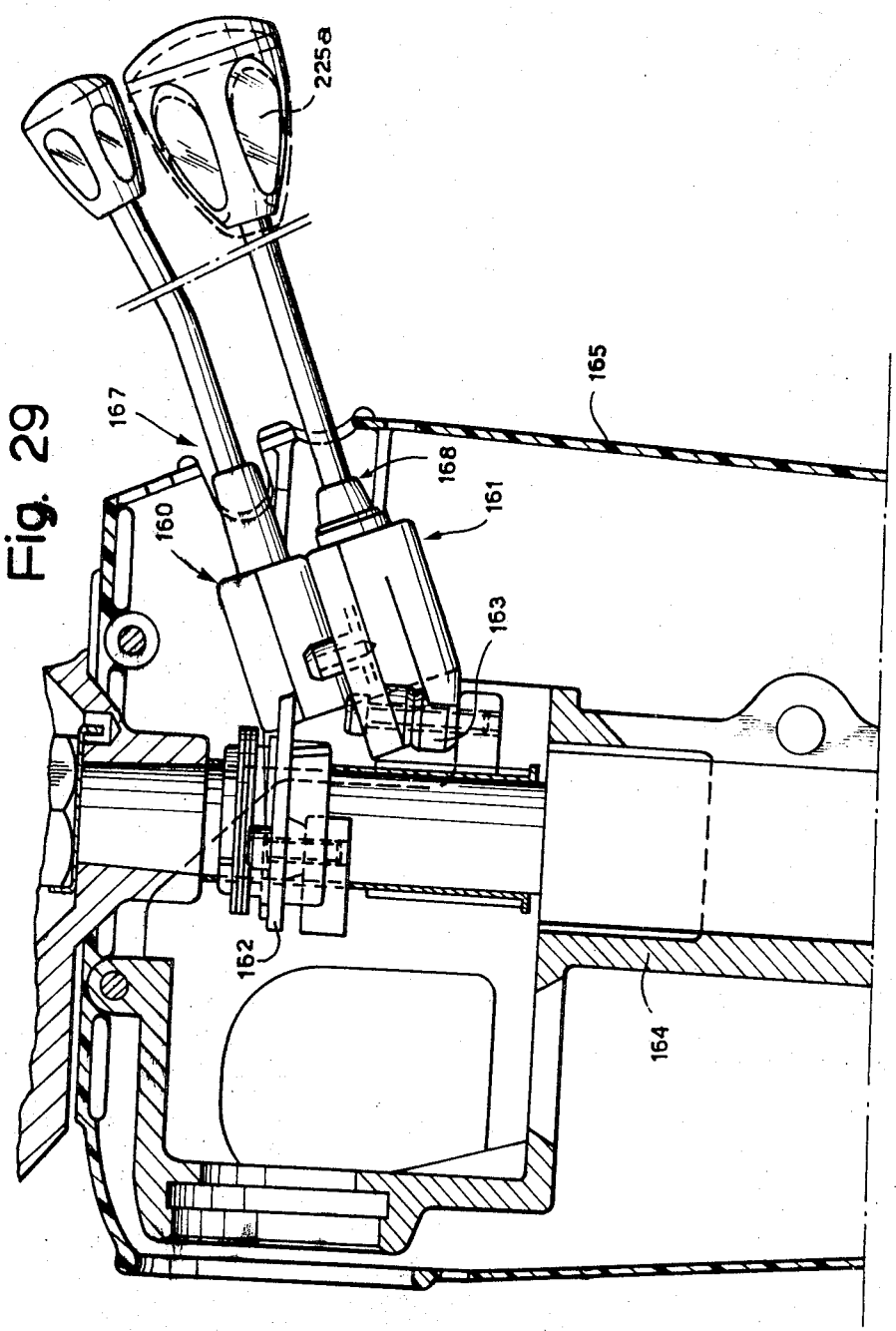

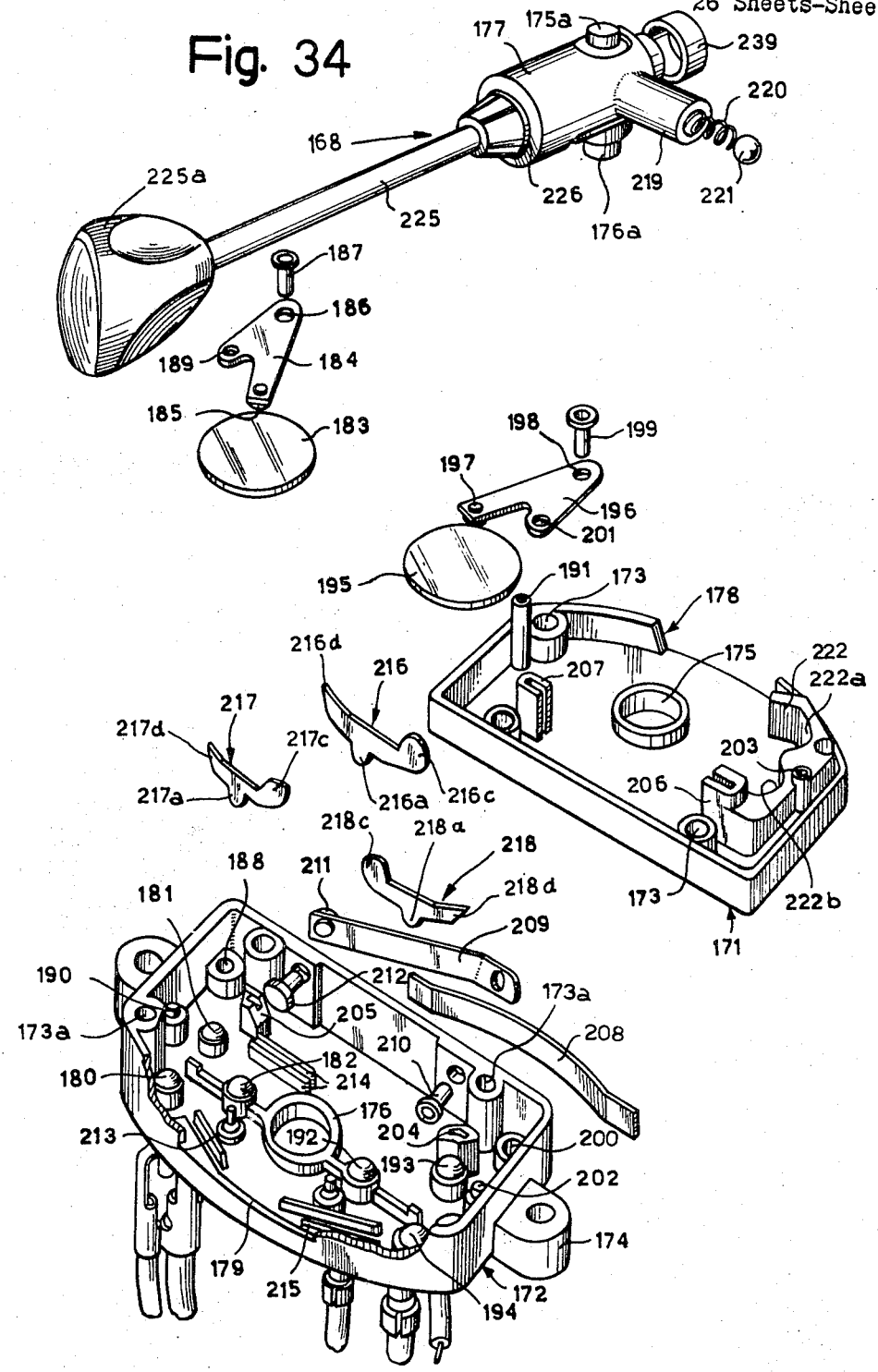

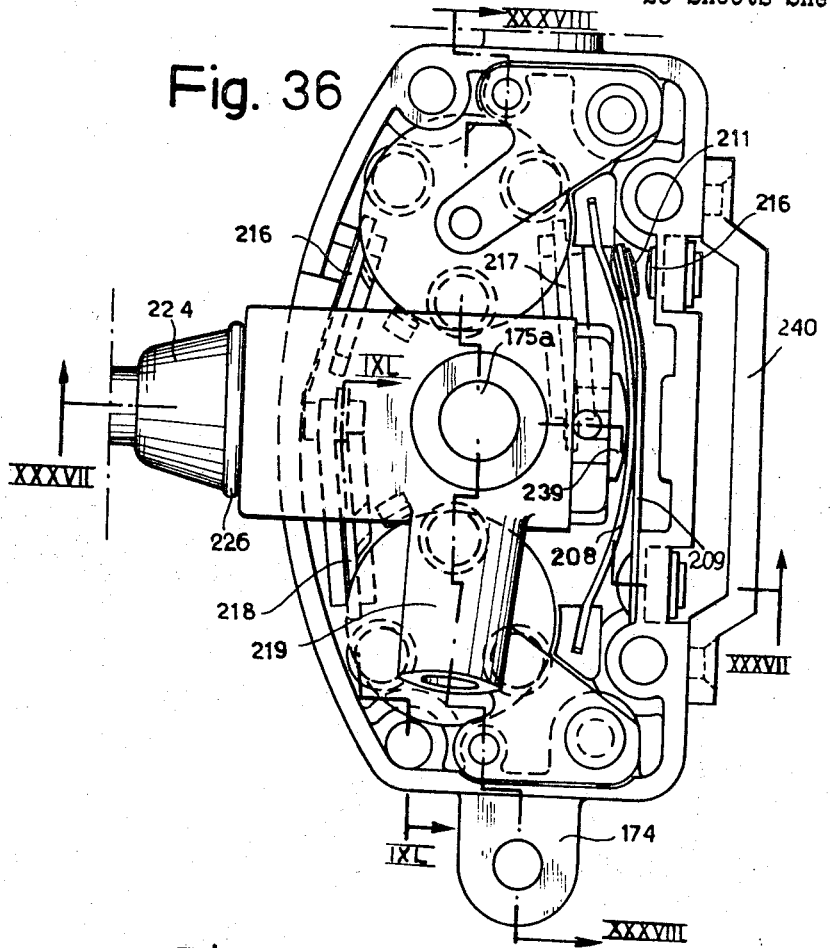
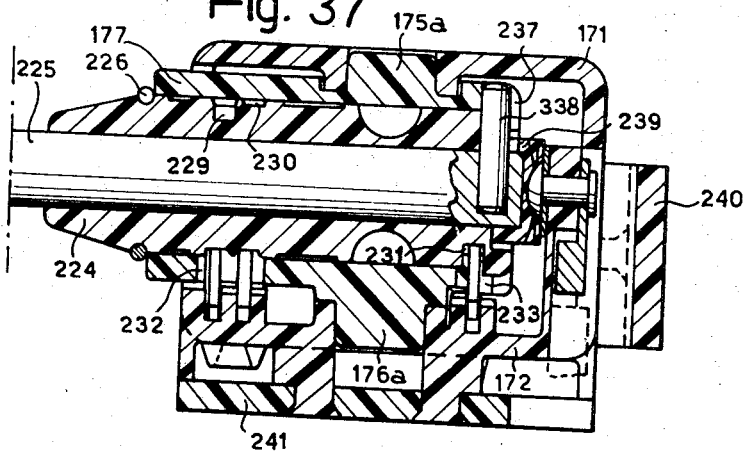

Sept. 22, 1970  M. VITALONI  3,530,266
SWITCHING CONTROL APPARATUS FOR VEHICLE DIRECTION INDICATORS
AND MAIN LIGHTS WITH OSCILLATORY DISC CONTACTS
Filed May 31, 1968  26 Sheets-Sheet 23

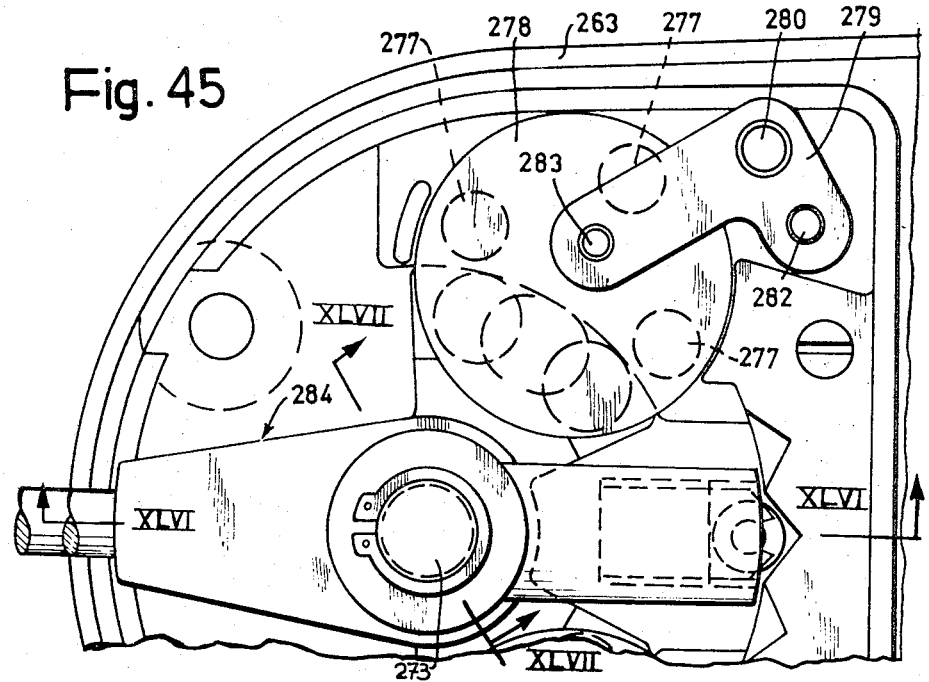
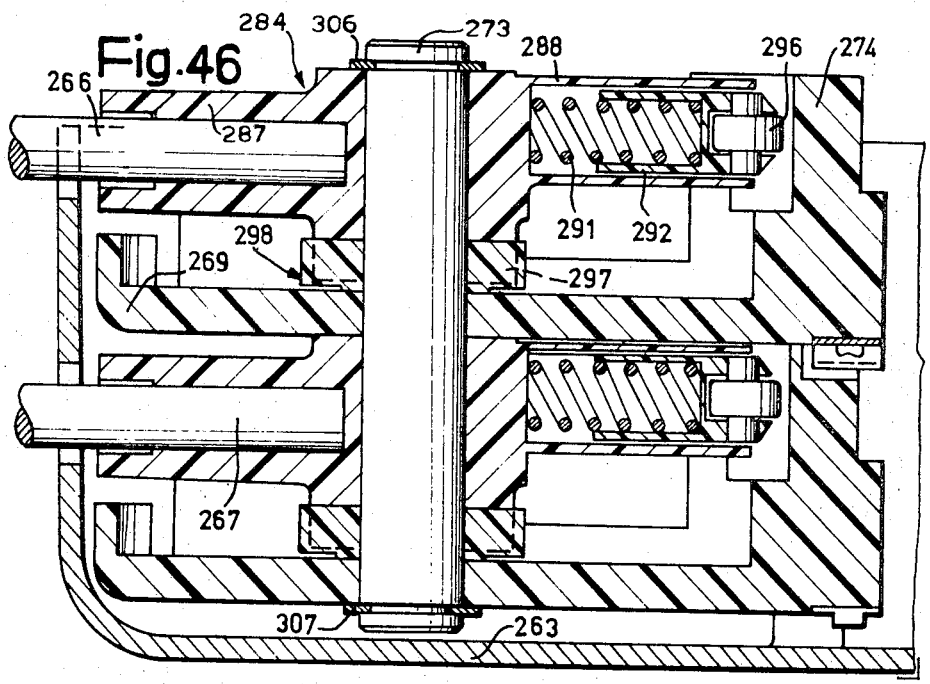

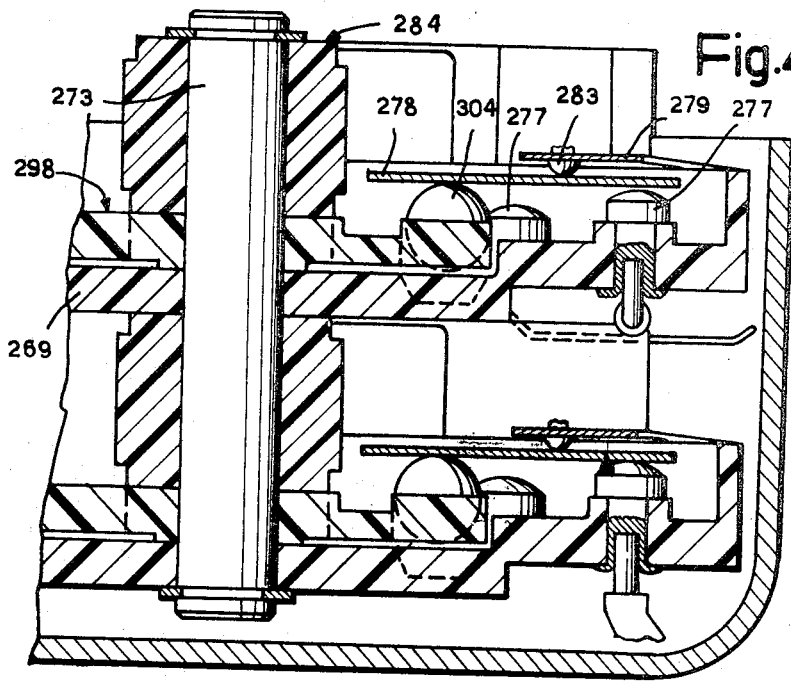
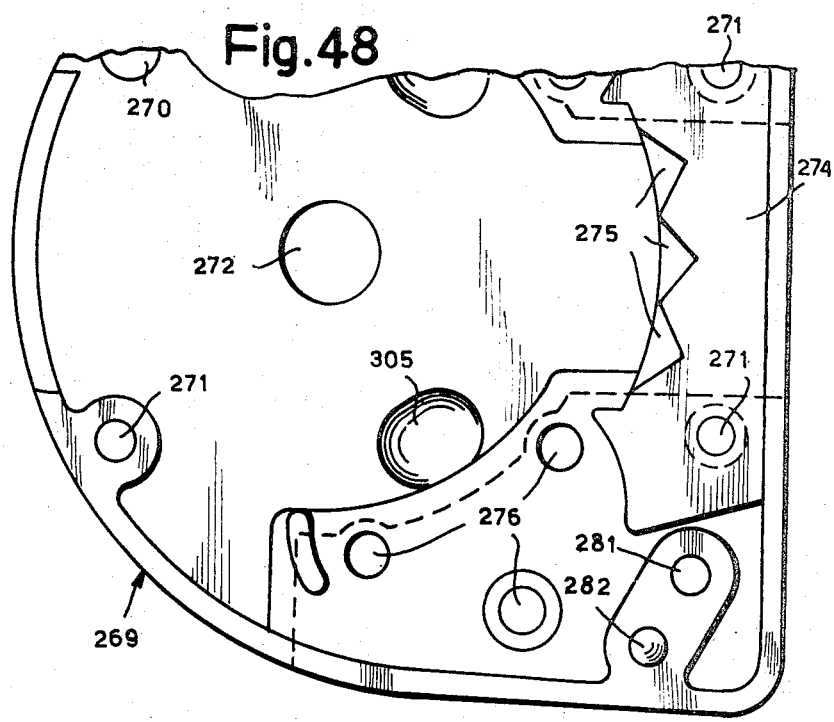

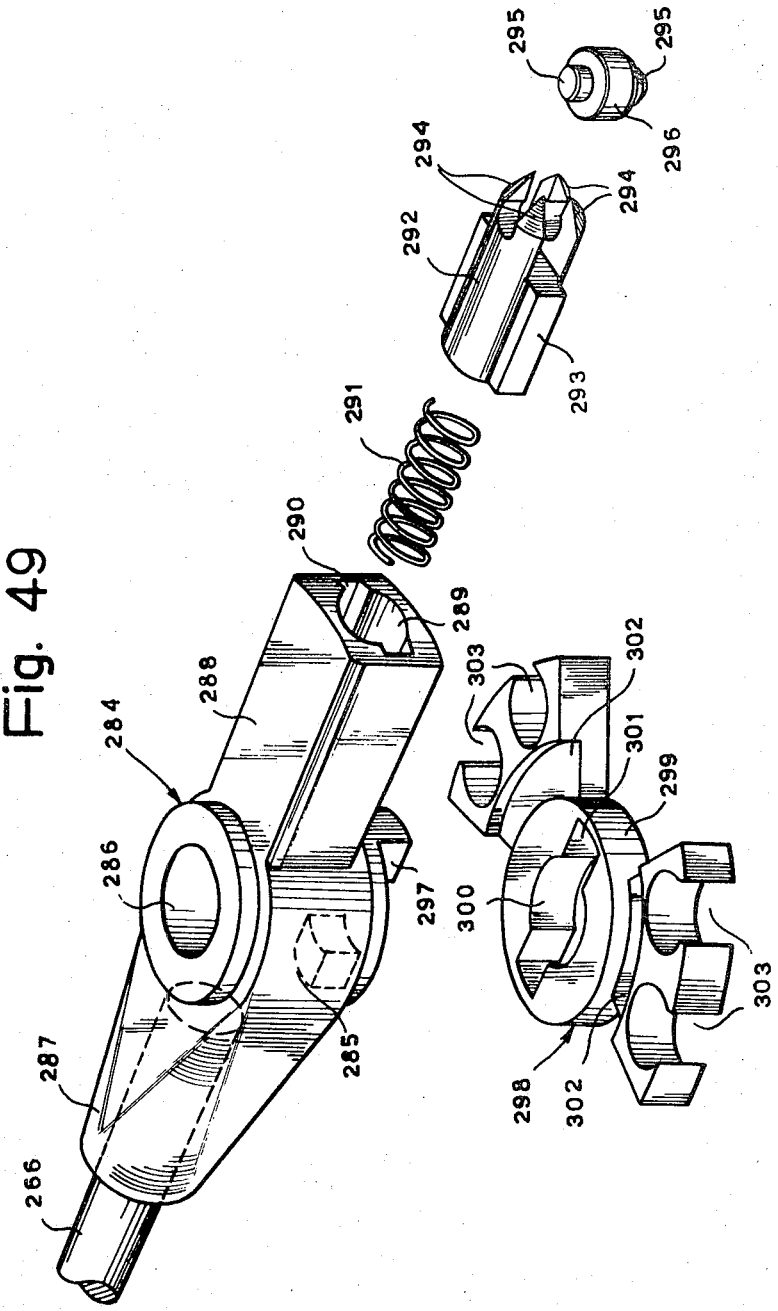

United States Patent Office 3,530,266
Patented Sept. 22, 1970

3,530,266
SWITCHING CONTROL APPARATUS FOR
VEHICLE DIRECTION INDICATORS AND
MAIN LIGHTS WITH OSCILLATORY DISC
CONTACTS
Massimo Vitaloni, Rivalta di Torino, Italy, assignor to
VIF-Vitaloni S.a.s. di Vitaloni Mario, Giovanni & C.,
Viale Risorgimento, Beinasco, Torino, Italy, an Italian
body corporate
Filed May 31, 1968, Ser. No. 733,551
Claims priority, application Italy, June 3, 1967,
51,936/67; Nov. 2, 1967, 53,578/67
Int. Cl. H01h 3/16
U.S. Cl. 200—61.34                               13 Claims

ABSTRACT OF THE DISCLOSURE

Switching control apparatus for steering-column mounting on a vehicle includes at least two switching units controlling the direction indicators and main lights, the units having respective operating levers which extend laterally outwardly on the same side of the steering column. Oscillatory discs are used as movable switching contacts, camming devices being used to control the inclination of these discs relative to fixed contacts in response to rocking movement, or in some embodiments, rotational or translational movement, of the respective operating lever.

---

This invention relates to switching control apparatus for the direction indicators and main lights of a motor vehicle, of the type mounted on a main support adapted to be attached to the steering column of the vehicle.

An object of the invention is to provide switching control apparatus of the above mentioned type which is simple and tough in construction, easy to assemble and is made up of a small number of component parts most of which can be moulded from plastics.

The switching control apparatus according to the invention comprises a main support adapted to be attached to a stationary part of a vehicle steering column and including at least two pre-assembled switching units for controlling the direction indicators and the main lights respectively, each unit having a respective operating lever extending laterally outwardly from and on the same side of the support.

The apparatus is durable and reliable in operation and its various operative units are separately disassemblable, the apparatus being suited for controlling, in addition to the direction indicators and main lights on the vehicle, further electrical equipment of the vehicle such as, for example, windscreen wipers. Thus a wide variety of controls may be effected in a simple and easy manner. The apparatus is, moreover, suitable for use on tractor and trailer assemblies requiring operation of the electrical circuits of the direction indicators and main lights simultaneously both on the tractor and trailer.

The invention will be more clearly understood from the following description, given by way of example only, with reference to the accompanying drawings, wherein:

FIG. 7 is an exploded perspective view of the switching unit for the direction indicators in the apparatus of FIGS. 1 to 6;

FIGS. 10, 11, 12, 13 and 14 are diagrammatic plan views showing different respective operative positions of release means associated with the switching unit for the direction indicators in the apparatus of FIGS. 1 to 6;

FIG. 15 is a plan view of the switching unit for the direction indicators without its cover plate and without the release means;

FIG. 24 is a plan view of the unit shown in FIG. 23, without its top cover plate;

FIG. 29 is a part-sectional elevational side view of switching control apparatus according to an alternative embodiment of the invention;

FIG. 34 is an exploded perspective view of the switching unit for the main lights in the embodiment of FIGS. 29 and 31;

FIG. 36 is a plan view on an enlarged scale of the main light switching unit of FIGS. 29 and 31 without its cover plate;

FIG. 37 is a cross-sectional view on line XXXVII—XXXVII of FIG. 36;

FIG. 45 is a plan view on an enlarged scale of a detail of one of the switching units of the apparatus of FIGS. 43 and 44;

FIG. 46 is an axial cross-sectional view on line XLVI—XLVI of FIG. 45;

FIG. 47 is a transverse cross-sectional view on line XLVII—XLVII of FIG. 45;

FIG. 48 is a top plan view of part of a supporting member for one of the switching units of the apparatus of FIGS. 43 and 44; and FIG. 49 is an exploded perspective view of part of the operating lever of one of the said switching units of the apparatus of FIGS. 43 and 44.

Figure 1:
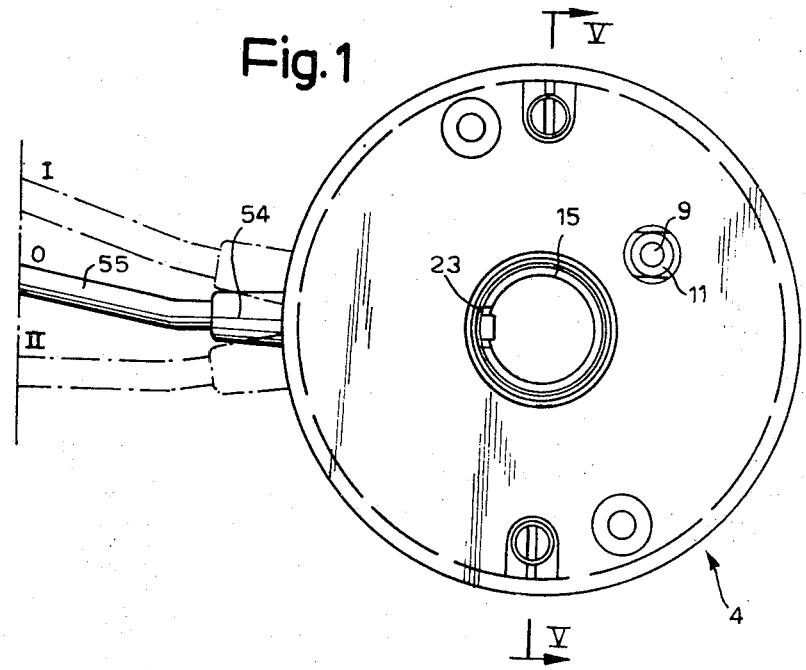
FIG. 1 is a top plan view of switching control apparatus for the direction indicators and vehicle main lights according to one embodiment of the invention.
Figure 2:
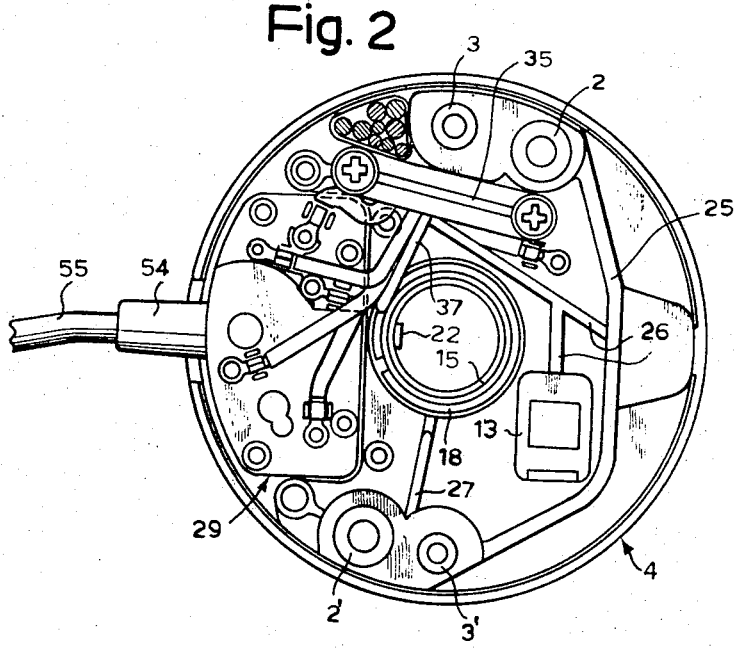
FIG. 2 is a bottom plan view of said apparatus.
Figure 3:
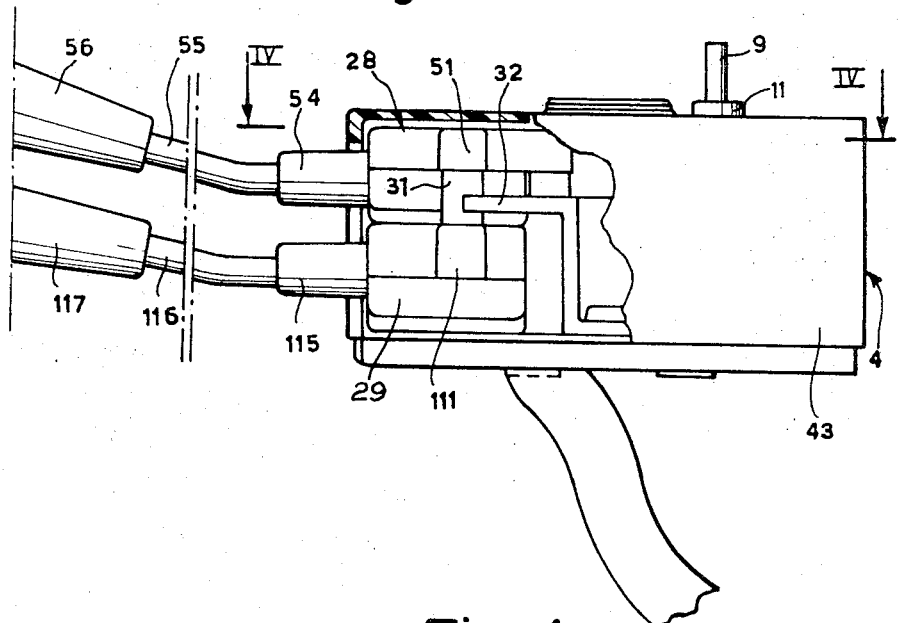
FIG. 3 is a part-sectional side elevational view of said apparatus.
Figure 4:
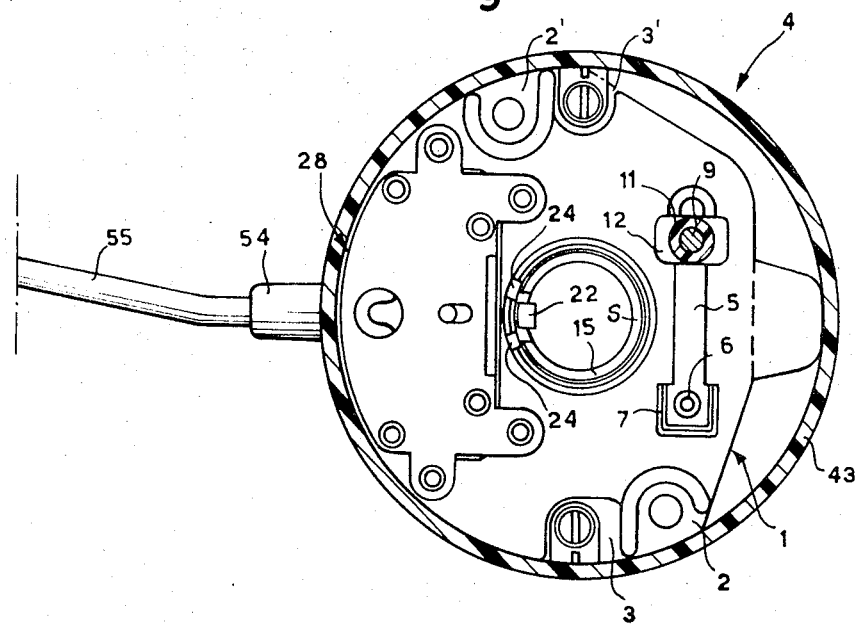
FIG. 4 is a cross-sectional view on line IV—IV of FIG. 3.
Figure 5:
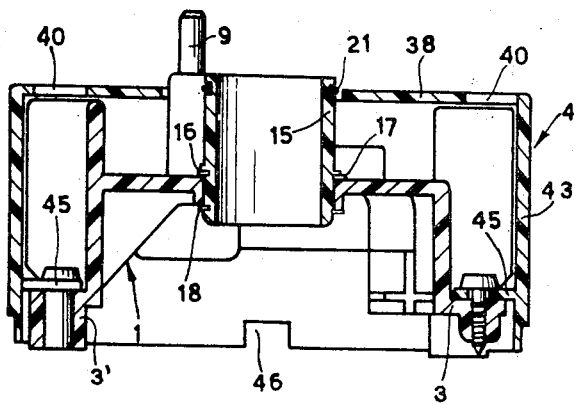
FIG. 5 is an axial sectonal view on line V—V of FIG. 1.
Figure 8:
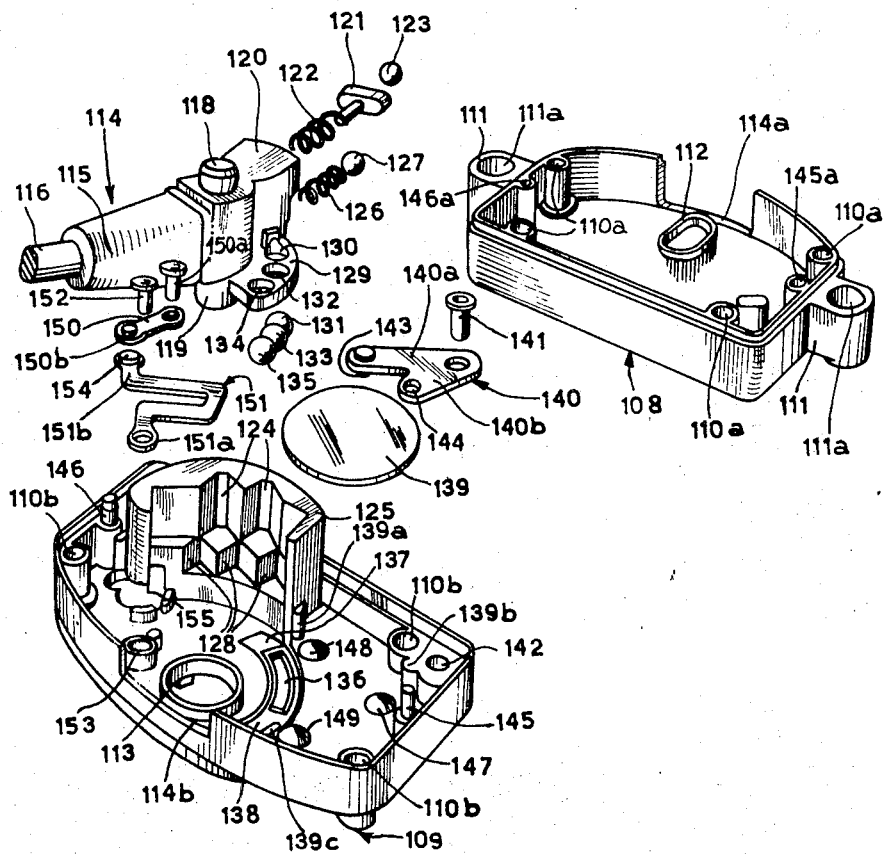
FIG. 8 is an exploded perspective view of the switching unit for the main lights in said apparatus.

As shown in FIGS. 1 to 6, switching control apparatus for the direction indicators and main lights of a vehicle has a main support 1 (FIG. 6) comprising a moulding of plastics provided with shaped extensions 2, 2' for securing the support 1 to a stationary component of the steering apparatus. Further shaped extensions 3, 3' in paired relationship to the extensions 2, 2', are provided for securing a protective plastics cover 4 to the support 1.

The support 1 carries on its top face a flexible contact 5 adapted to feed electric current to the vehicle horn through a switch carried by the steering wheel (not shown). The contact 5 comprises one or two coupled spring strips secured at one end by a rivet 6 to a projection 7 on the support 1 and connected by the same rivet to a supply conductor situated on the underside of the support 1. The free end of the contact 5 is associated with a vertical rod 9 slidably mounted in a tubular sleeve 11 secured to a bridge piece 12 integral with the support 1. Downward movement of the rod 9 is opposed by a spring accommodated in a recess 13 (FIG. 2) in the support 1. The top end of the rod 9 is adapted to contact a wiping member on the steering wheel, which is electrically connected with the horn switch on said steering wheel.

The support 1 is formed with a central circular opening 14 having rotatably mounted therein a tubular member 15 of plastics provided with an annular flange 16 (FIG. 5) adapted to abut the top face of the support 1, the tubular member 15 being prevented from axial movement relative to the support 1 by means of a retaining split ring 18 accommodated in an external circumferential groove 19 in the tubular member 15. Annular washers 17 are interposed between the flange 16 and top face of the support 1 as well as between the retaining ring 18 and bottom face of the support 1.

The tubular member 15 is formed at its upper end with an annular external groove 20 which receives a further split ring 21. A spring catch 22 defined between two axially extending slits 23 intersecting the groove 20 is urged radially inwardly by the split ring 21 to engage a recess in the steering shaft of the vehicle, indicated diagrammatically at S in FIG. 4, over which the tubular member 15 is fitted. In this way the tubular member 15 is connected to the steering shaft S for rotation with the steering wheel.

The tubular member 15 is provided externally with two radial extending teeth 24 adapted to co-operate with release means for the direction indicator switching unit, as described hereafter.

The support 1 is provided on its lower face with reinforcing ribs 25, 26, 27.

Two independent switching units 28, 29 are secured to the support 1 for controlling the direction indicators and main lights, respectively. The units 28, 29 are pre-assembled and enclosed in respective plastics casings which are secured to two bosses 31 (FIG. 6) carried by two platforms 32 of the support 1, the unit 28 being mounted above the platforms 32 and being also secured to two further bosses 33 on the support 1, and the unit 29 being mounted below the platforms 32.

An auxiliary member 35 is secured to the underside of the support 1 and is provided at its ends with enlarged bosses 36 for connection by means of screws to corresponding bosses 34 (one only of which is shown) on the support 1. The member 35 is provided with a lateral extension 37 and is adapted to retain against the support 1 the bundle of conductors connecting the various contacts to the respective electrical circuits of the vehicle.

All components of the apparatus are enclosed in the cover 4 which has a cylindrical wall 43 provided with a flat top 38. The top 38 is formed with a central bore 39 (FIG. 6) for receiving the tubular member 15 and two shaped openings 40 for permitting access by a screwdriver for screwing and unscrewing screws connecting internal lugs 45 on the wall 43 to the two shaped extensions 3, 3' on the support 1. The top 38 of the cover of the cover 4 is formed with two further holes 41 for permitting access by a screwdriver for screwing and unscrewing screws securing the shaped extensions 2, 2' on the support 1 to the stationary part of the steering apparatus. A hole 42 is also formed in the top 38 near the bore 39 for the through passage of the horn actuating rod 9.

The cylindrical wall 43 of the casing 4 is formed with a lateral opening 44 for the operating levers for the respective units 28, 29 and with a further opposite opening 46 (FIG. 5) for keying to a stationary component of the steering wheel.

As shown in FIGS. 6, 7, 9, 15, 16, the unit 28 for operating the direction indicators comprises a plurality of stationary and movable members enclosed by top and bottom shells 47, 48 moulded from plastics and interconnected by rivets 49 accommodated in hollow cylindrical bosses 49a, 49b on the shells.

The top shell 47 is provided with two rearwardly extending lugs 50 formed with holes 50a adapted to co-operate with the bosses 33 on the support 1 for attachment of the unit 29 to the support; the top shell 47 is further provided with lateral extensions 51 formed with holes 51a adapted to co-operate with the bosses 31 on the platforms 32 of the support 1.

Figure 6:
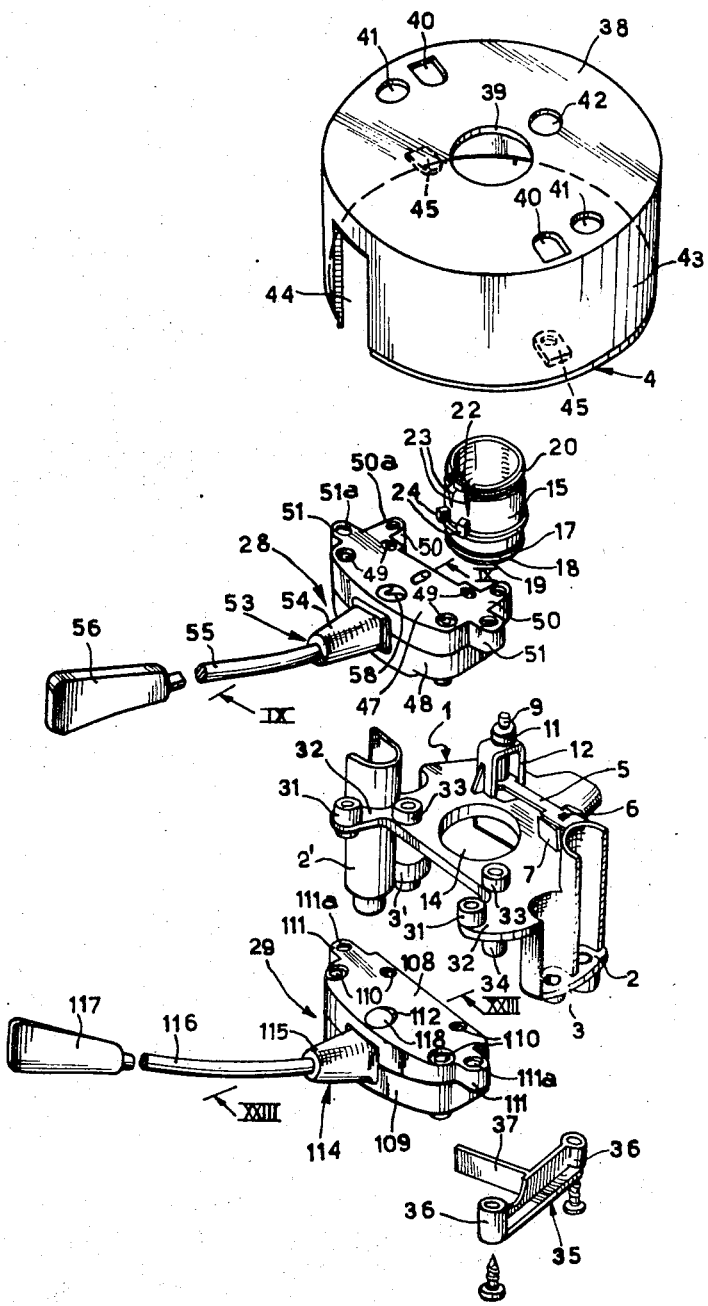
FIG. 6 is an exploded perspective view of the apparatus of FIGS. 1 to 5.
Figure 9:
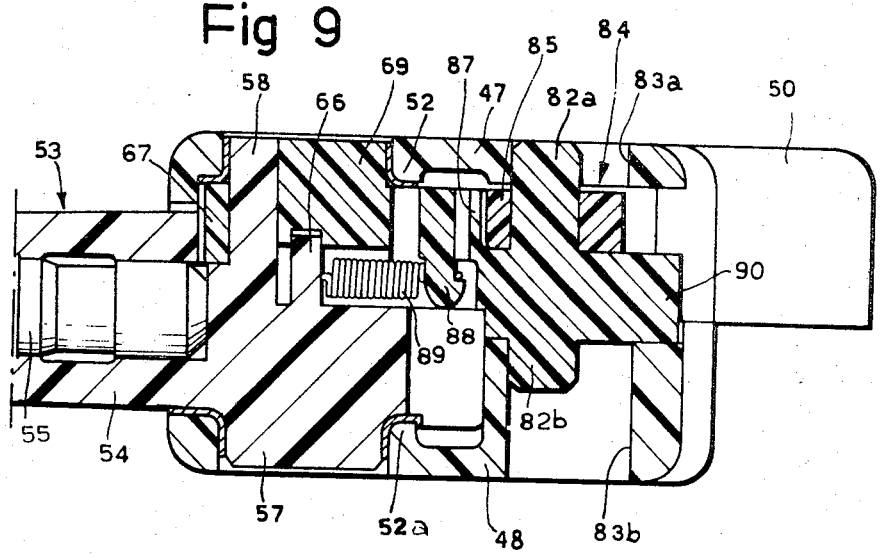
FIG. 9 is a cross sectional view on an enlarged scale of the control unit for the direction indicators taken, on line IX—IX of FIG. 6.
Figure 16:
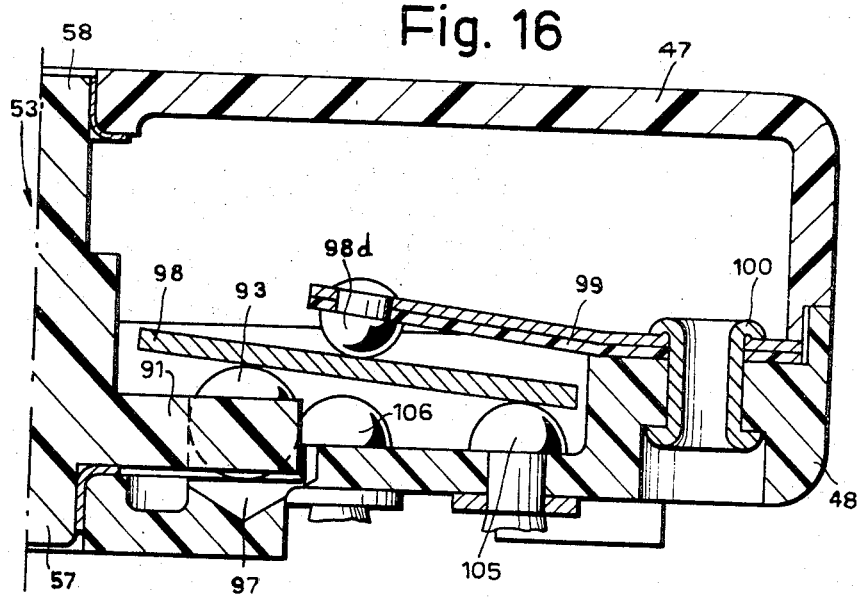
FIG. 16 is a cross sectional view on line XVI—XVI of FIG. 15.

The two shells 47, 48 are formed with two cylindrical openings 52, 52a surrounded by annular ridges internally of the shells, said ridges being aligned along a common axis on assembly of the two shells 47, 48. Two pins 57, 58 are rotatably received in the openings 52a, 52 respectively. The pins 57, 58 form part of an operating lever 53 comprising a moulding of plastics 54 keyed to a metal rod 55 acting as a handle and carrying at its free end a shaped knob 56 (FIG. 6).

As seen in FIG. 7, the operating lever 53, which extends outwardly through two aligned openings 53a, 53b in the shells 47, 48 respectively, is provided within the shels with an extension 59 accommodating in its end a ball 60 urged outwardly by a helical spring 61. The ball 60 is adapted to co-operate with a plurality of notches 62 in a positioning rack 63 secured to the bottom shell 48.

The top pin 58 of the lever 53 is formed with a shaped longitudinal recess 64 (FIG. 7) within which a pin 66 coaxial with the rotational axis of the lever 53, is arranged. The pin 58 is surrounded at its lower end by a step 65 formed integrally with the plastics moulding 54.

A spring member 67 moulded from plastics is formed with a central hole 68 and a shaped extension 69 adapted to fit into the recess 64 in the pin 58 to couple the spring member 67 for rotation with the lever 53.

The spring member 67 is formed with two external arms 70, 70' having symmetrically arranged portions 80, 80' formed with two inclined outer flanks 80a, 80'a and two inner flanks 80b, 80'b oppositely inclined to the flanks 80a, 80'a. The spring member 67 is also formed with two internal symmetrical arms 81, 81' adapted to co-operate with the inner flanks 80b, 80'b of the external arms 70, 70'.

The arms 70, 70' of the spring member 67 co-operate with a pawl 82 forming part of the automatic release mechanism for the lever 53, the pawl 82 being likewise moulded from plastics and provided with upper and lower pins 82a, 82b engageable in respective slots 83a, 83b in the shells 47, 48 respectively.

The upper pin 82a of the pawl 82 rotatably engages a further two-armed spring member 84 moulded from plastics, having a central boss 85 formed with a hole 85a and two lateral spring arms 86, 86' adapted to co-operate with the portions 80, 80' of the spring member 67.

The pawl 82 is further provided with a rear extension 87 having on its bottom face a pin 88 adapted to be connected by means of a spring 89 to the pin 66 in the middle recess 64 in the lever 53; a front extension 90, opposite the extension 87, extends outwardly through an opening 90a, 90b formed by the two shells 47, 48 and is movable into and out of the path of movement of radially extending teeth 24 on the rotatable tubular member 15 fast with the steering shaft.

The body portion of the lever 53 has secured thereto a sector-shaped radial extension 91 angularly offset with respect to the extension 59 and formed with two circular seatings 92, 94. Two balls 93, 95 are located in the respective seatings 92 94 and are adapted to roll, upon rocking movement of the lever 53 about its transverse pivot axis, over an arcuate track 96 on the bottom of the lower shell 48. The track 96 has a central depression 97.

Upon assembly, part of the peripheral portion of a conductive disc 98 constituting a movable contact is situated over the track 96 and rests on the balls 93, 94 carried by the extension 91. The disc 98 is kept centered in its operative position by three projections 98a, 98b, 98c (FIG. 15) on the bottom shell 48. The disc 98 is adapted to bear selectively on fixed hemispherical contacts 105, 106 and 107 carried by the bottom shell 48 to operate the vehicle direction indicators selectively, the contacts 106, 107 being connected, in use of the apparatus, to respective direction indicator circuits, and the contact 105 to a common current supply lead. The disc 98 is biassed by a spring member 99 of V-shape, secured at its apex by a rivet 100 to a seating 101 on the bottom shell 48. The spring member 99 has a longer arm 99a carrying a part-spherical pivot element 98d adapted to bear centrally on the disc 98, and a shorter arm 99b formed with a hole 102 in which a pin 103 fast with the bottom shell 48 engages. The pin 103 and a corresponding pin 104 on the other side of the shell 48 are engaged by sockets 103a, 104a on the top shell 47 upon assembly of the unit 29.

The disc 98 is movable into engagement with selected fixed contacts 105, 106, 107. The positions of the disc 98 for the different operative positions of the lever 53 are shown in FIGS. 17 to 22.

Figure 17:
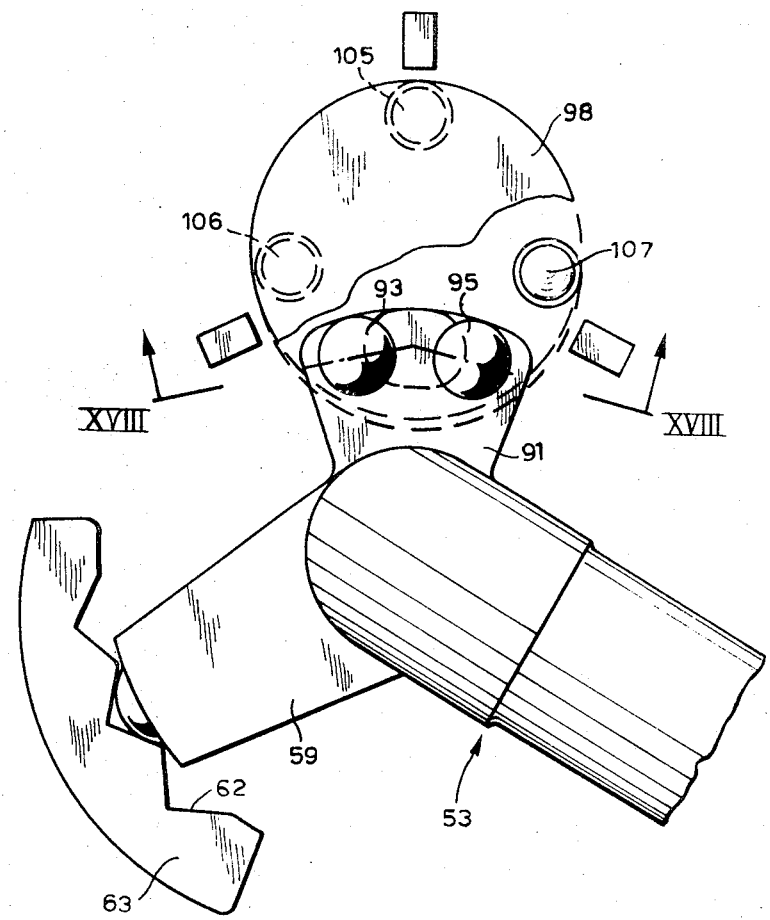
FIGS. 17, 19 and 21 are three diagrammatical plan views showing three different operative positions of the electrical contacts associated with the switching unit for the direction indicators.
Figure 18:
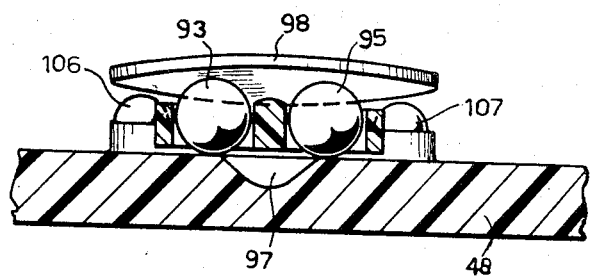
FIGS. 18, 20 and 22 are cross-sectional views on lines XVIII—XVIII, XX—XX and XXII—XXII, in FIGS. 17, 19 and 21 respectively.

In an inoperative or rest position of the lever 53 denoted by O in FIG. 1, the lever extension 91 is arranged as shown in FIGS. 17 and 18. Neither of the balls 93, 95 is located in the depression 97 of the track 96. The disc 98, which is pressed downwardly on to the balls 93, 95 by the spring member 99, is out of engagement with the lateral contacts 106, 107 and rests solely on the contact 105 which, as stated above, serves as a current lead-in contact, so that neither direction indicator circuit is energised.

Figure 19:
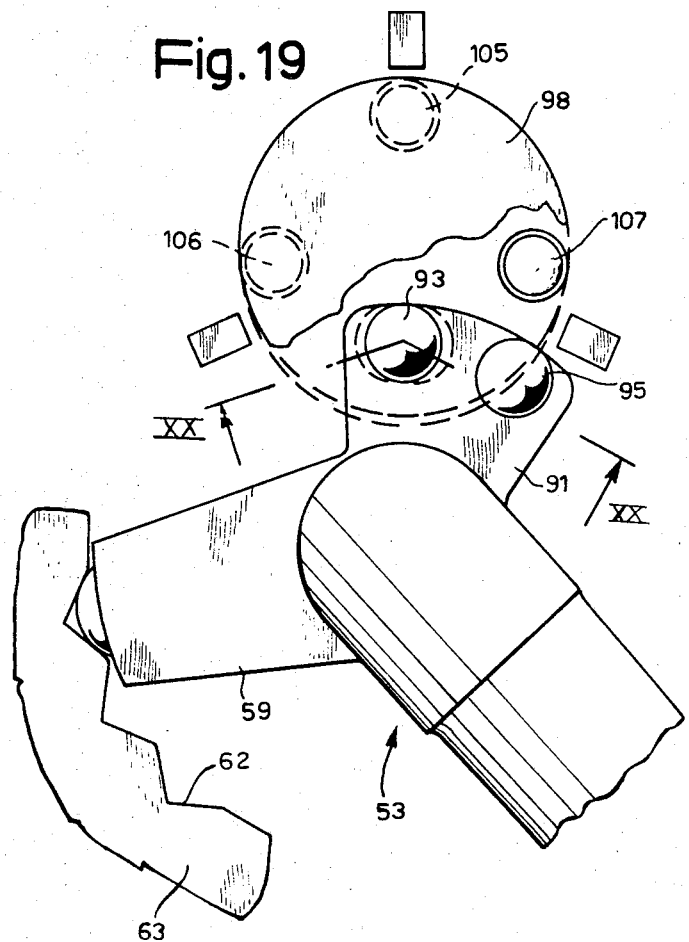
Figure 20:
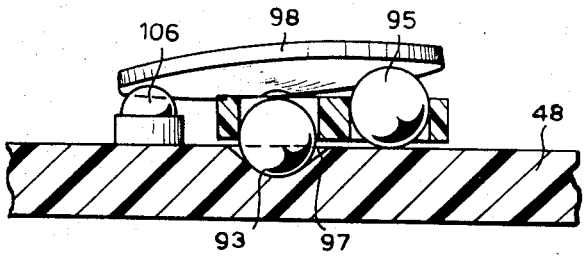

By moving the lever 53 from its position O to its position I (FIG. 1) in a clockwise direction, the extension 91 is displaced as shown in FIGS. 19 and 20 so that the ball 93 falls into the recess 97 and the ball 95 comes into proximity to the edge of the disc 98. The spring member 99 acting centrally on the disc 98 causes the latter to incline and bear on one of the lateral contacts, 106, in addition to the contact 105, thereby closing the circuit of one of the direction indicators to operate the latter.

Figure 21:
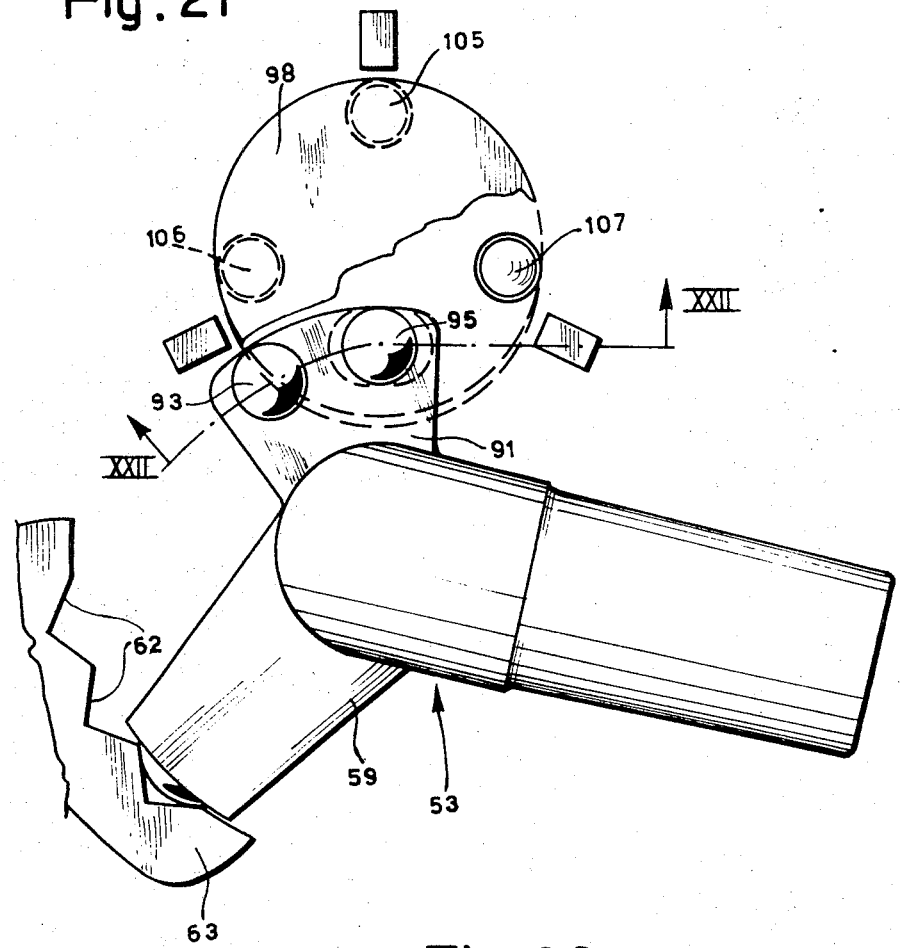
Figure 22:
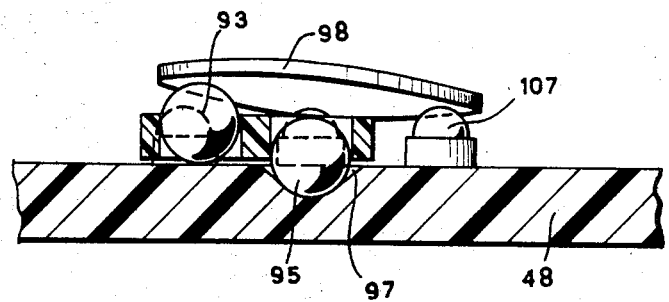
Figure 23:
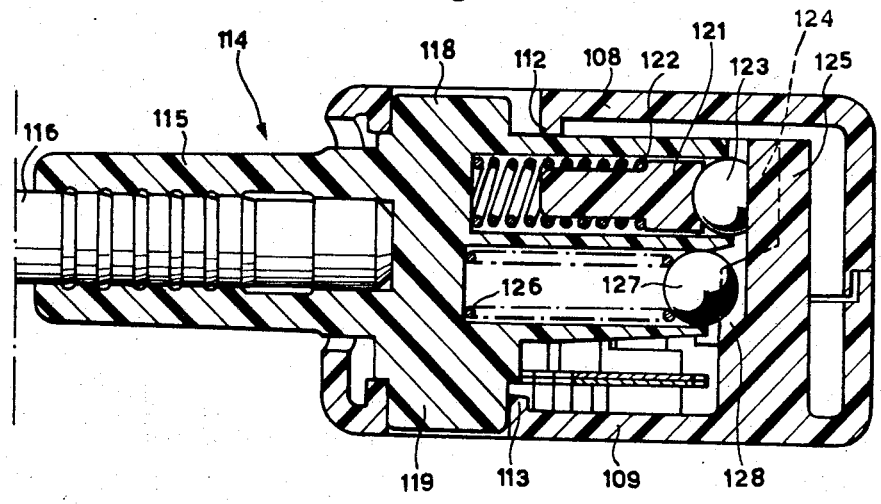
FIG. 23 is a cross-sectional view of the switching unit for the main lights, taken on line XXIII—XXIII of FIG. 6.

When the lever 53 is moved anti-clockwise from position O to position II (FIG. 1), the extension 91 is displaced to the position shown in FIGS. 21 and 22, and causes the ball 95 to fall into the depression 97 in the track 96. The disc 98 tilts in the opposite direction, thereby electrically connecting the intermediate contact 105 with the other lateral contact 107 to complete the operating circuit of the other direction indicator.

The lever 53 is held in its three different respective positions O, I, II by the resilient engagement of the ball 60 in the respective notches 62 in the positioning rack 63.

Release of the lever 53 and its automatic return to the inoperative position O after steering around a curve is effected, as shown in FIGS. 10 to 14, by the interengagement of one of the radial teeth 24 on the tubular body 15 fast with the steering wheel and the extension 90 on the pawl 82.

Figure 10:
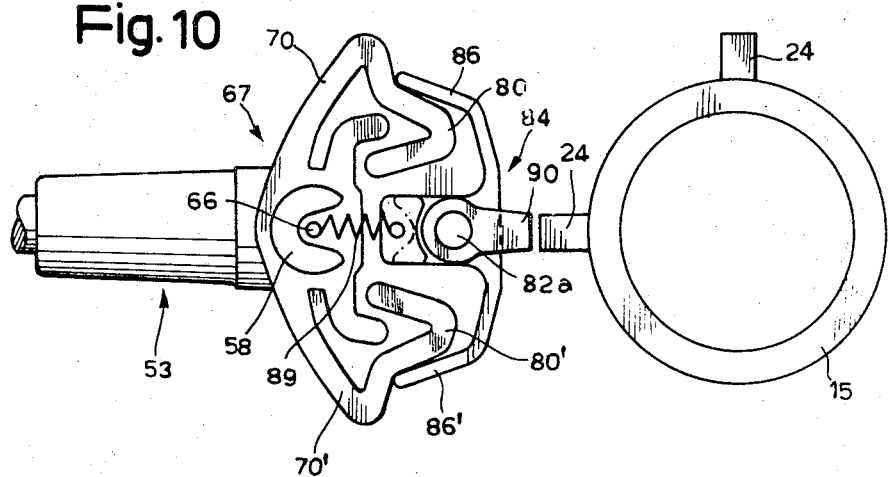

In the inoperative position, corresponding to lever position O, shown in FIG. 10, the spring 89 holds the pawl 82 and two-armed spring member 84 in their central position, so that the extension 90 is disposed clear of the path of movement of the teeth 24 of the tubular member 15.

Figure 11:
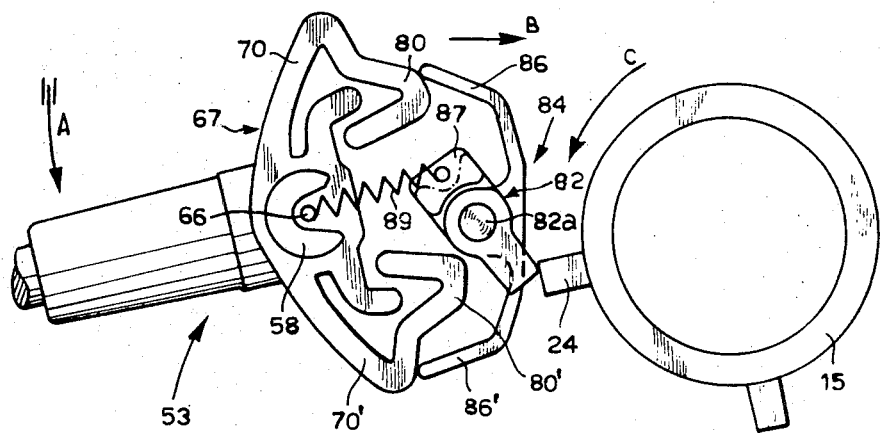

By rocking the lever 53, for example anti-clockwise in direction A, into position II as shown in FIG. 11, the shaped outer flank 80' of one of the arms 70' of the spring member 67 acts on the co-operating spring arm 86' of the spring member 84 and displaces the pawl 82 and the spring member 84 outwardly in the direction B, causing the spring 89 to extend, the pins 82a, 82b being displaced in the slots 83a, 83b respectively.

In this position, if the steering wheel rotates anti-clockwise in direction C for steering around a curve, in the direction indicated by the rocking of the lever 53, the teeth 24 in the tubular member 15 engage the extension 90 on the pawl 82 and cause the pawl 82 to rock freely about the common axis of its two pins 82a, 82b (FIG. 11). If, however the steering wheel is rotated clockwise in direction D, FIG. 12, the first tooth 24 engaging the extension 90 on the pawl 82 rocks the latter in the direction E, so that its opposite extension 87 is moved in the direction E' and comes into contact with the inner blank 80'b of the respective arm 70' of the spring member 67, pivoting the lever 53 about its pivot pins 57, 58 and restoring the lever 53 in direction F; the lever is therefore released from position II and resumes its inoperative position O, the spring 89 causing the two spring members 67, 84 to revert to the positions shown in FIG. 10, with the pawl 82 retracted.

Exactly analogous operations occur when the operating lever 53 is rocked in an opposite direction into position I.

The elasticity of the spring members 67 and 84, together with that of the spring 89 interconnecting the pawl 82 and pin 66 on the lever, make displacement of the lever 53, for example in direction A, possible even when the extension 90 of the pawl 82 is juxtaposed to one of the teeth 24 in the tubular member 15, as shown in FIG. 13. In this case the arms 86, 86' of the spring member 84 are deformed permitting displacement of the lever 53, the pawl 82 and spring member 84 adopting the position shown in FIG. 11 after the tooth 24 of the tubular member 15 has moved out of engagement with the extension 90, upon movement of the steering wheel.

When a steering operation has to be effected without automatic release and restoration of the lever 53, the latter is manually held in its respective operative position (for example, position II, FIG. 14) while the steering wheel is rotated in the direction D after steering around the indicated curve. One of the teeth 24 then engages the extension 90 and moves the pawl 82, causing deformation both of the spring member 67 and the spring member 84, the spring 98 being further stretched and acting on the lever 53 cause the latter to remain in said operative position during said steering operation.

As shown in FIGS. 8, 23, 24, 25 the main switching unit 29 comprises a casing formed by two symmetrical juxtaposed shells 108, 109 moulded from plastics and interconnected by rivets 110 accommodated in respective cylindrical bosses 110a, 110b situated within the respective shells 108, 109. The top shell 108 is provided with lateral extensions 111 formed with holes 111a and adapted to co-operate with the bosses 31 carried by the extensions 32 on the support 1 (FIG. 6).

The two shells 108, 109 are formed with two openings 112, 113 surrounded by annular ridges and are of elliptical and circular shape respectively. Two cylindrical pins 118, 119 carried by an operating lever 114 engage in the respective openings 112, 113 respectively. The lever 114 comprises a member 115 moulded from plastics having attached thereto a metal rod 116 provided at its end with a knob 117 (FIG. 3) The lever 114 extends outwardly through aligned openings 114a, 114b formed in the respective shells 108, 109.

The lever 114 is provided with a main extension 120 accommodating two superposed radially extending bores. The upper bore accommodates a piston 121 which is elongated transversely and urged outwardly by a spring 122, the piston 121 engaging a ball 123. The lower bore accommodates a ball 127 which is urged outwardly by a spring 126.

The two balls 123, 127 co-operate with two respective positioning racks comprising respective sets of recesses 124, 128 formed in a support 125 integral with the bottom shell 109, the recesses 124, 128 being staggered relatively to each other in order to provide a differential action, reducing the effort necessary for moving the lever 114 from one operative position to another.

The lever 114 is provided with a sector-shaped radial extension 129 angularly displaced from the extension 120 and formed with circular seatings 130, 132, 134 co-operating with three balls 131, 133, 135 which are adapted to roll on an arcuate track carried by the bottom shell 109 and comprising an arcuate depressed region 136 bounded at opposite ends by respective raised portions 137, 138.

A metal disc 139 constituting a movable contact is arranged over the track and is biassed towards the track by a spring member 140 of V-shape secured by a rivet 141 to a seating 142 in the bottom shell 109. The disc 138 is held centered by three projections 139a, 139b, 139c disposed around the periphery of the disc on the bottom shell 109. The spring member 140 has a longer arm 140a carrying at its end a semi-cylindrical protuberance 143 which engages on the disc 139 centrally. The spring member 140b also has a shorter arm 140b formed with a hole 144 which, upon assembly of the unit 29 is engaged by a pin 145 on the bottom shell 109. The pin 145 and a similar pin 146 on the other side of the bottom shell 109 are engaged in respective sockets 145a, 146a in the top shell 108.

Figure 26:
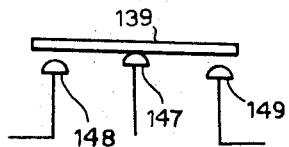
FIGS. 26, 27 and 28 are three diagrammatic views illustrating three different operative positions of the electric contacts associated with the switching unit for the main lights.
Figure 28:
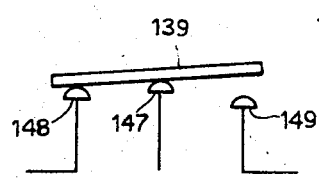
Figure 27:
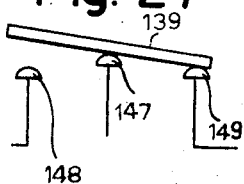

The disc 138 co-operates with three fixed hemispherical contacts 147, 148 and 149 for selective switching the lights. The selective switching operation by selective tilting of the disc 138 is similar to that described previously in connection with the disc 98 of the switching unit 28. Thus as shown diagrammatically in FIGS. 26, 27 and 28 the disc 139 is held in an inoperative or rest position, FIG. 26, when the lever 114 is in one extreme position, corresponding to the position I of the lever 54 shown in FIG. 1. In the central position of the lever 114, corresponding to position O of the lever 54, the disc 139 is inclined, FIG. 27, to close the circuit between the contact 147, which is connected as a current lead-in contact, and one of the lateral contacts 149; in the other extreme position, corresponding to the position II of the lever 154, the disc 149 is oppositely inclined, FIG. 28, to close the circuit between the contact 147 and the other lateral contact 148.

A stationary contact arm 150 is provided on the bottom shell 109 in proximity to the positioning rack support 125 and is connected to a projection on the shell by a rivet 150a. The contact arm 150 has a free end provided with a silver contact stud 150b. The contact stud 150b co-operates with a silver contact stud 154 carried by one arm 151b of a resilient contact strip 151 of V- or U-shape. The other arm 151a of the contact strip 150 is secured by a rivet 152 to a seating 153 in the bottom shell 109.

Figure 25:
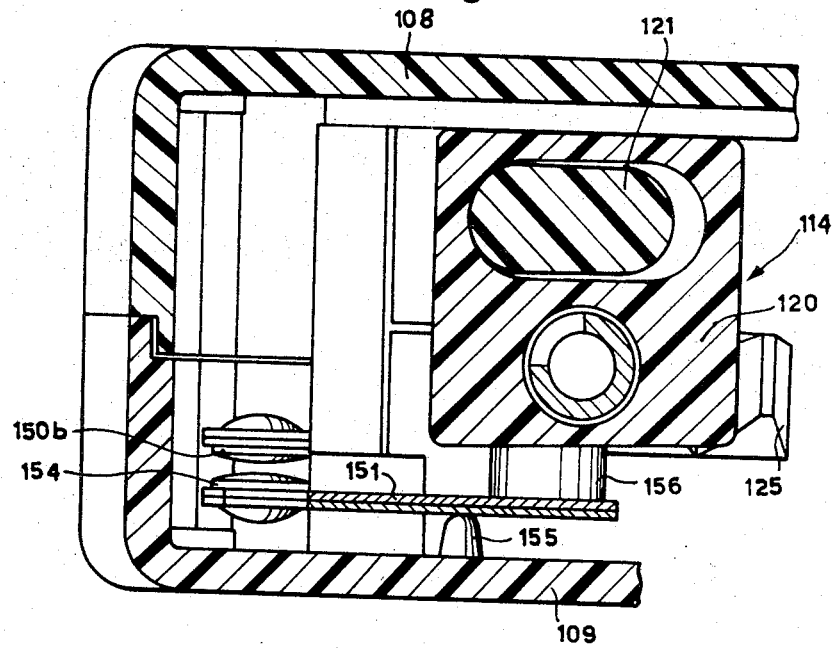
FIG. 25 is a cross-sectional view on line XXV—XXV of FIG. 24.

As shown in FIGS. 24 and 25, the arm 151b of the contact strip 151 rests at an intermediate region on a projection 155 on the bottom shell 109. The projection 155 acts as a fulcrum for the arm 151b. A protuberance 156 carried by the extension 120 of the operating lever 114 is adapted to engage the intermediate portion of the arm 151b.

Transverse rocking movement of the lever 114 in a plane containing its rotational axis is made possible by the elongated shape of the seating 112 for the upper pin 118 of the lever. Such rocking movement causes the protuberance 156 to rock the arm 151b about the fulcrum formed by the projection 155 so as to bring the silver contact studs 154, 150b into contact to complete a circuit including the headlights. Flashing of the headlights can therefore be effected by such rocking movement of the lever 114.

In the embodiment shown in FIGS. 29 and 30, 160 and 161 denote upper and lower switching units for the direction indicators and for switching of the main lights, respectively. Both units are secured to supporting members 162, 163 of fork shape supported in turn by a tubular metal member 164 coaxially surrounding the steering column. The device as a whole is enclosed by a stationary housing 165 through which the operating levers 167, 168 for the two units 160, 161 respectively, extend. The two units 160, 161 are superposed and are inclined at the same angle to the steering column.

Figure 33:
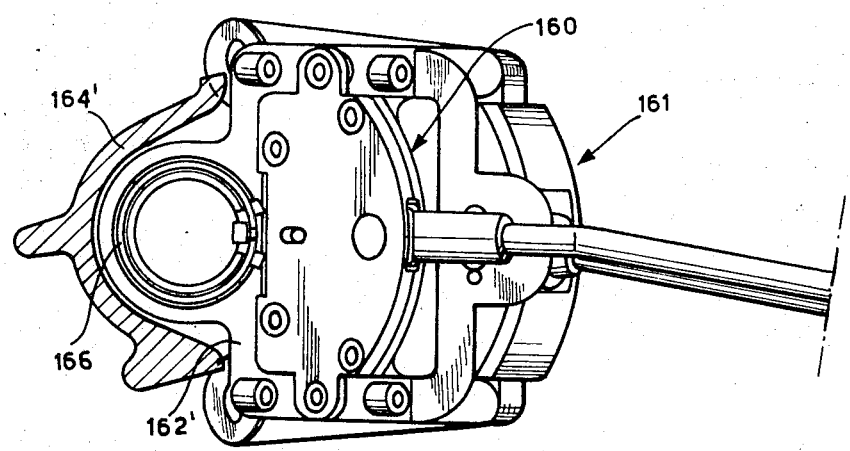
FIG. 33 is a partly sectioned top plan view of the switching units of the apparatus of FIGS. 31 and 32.
Figure 31:
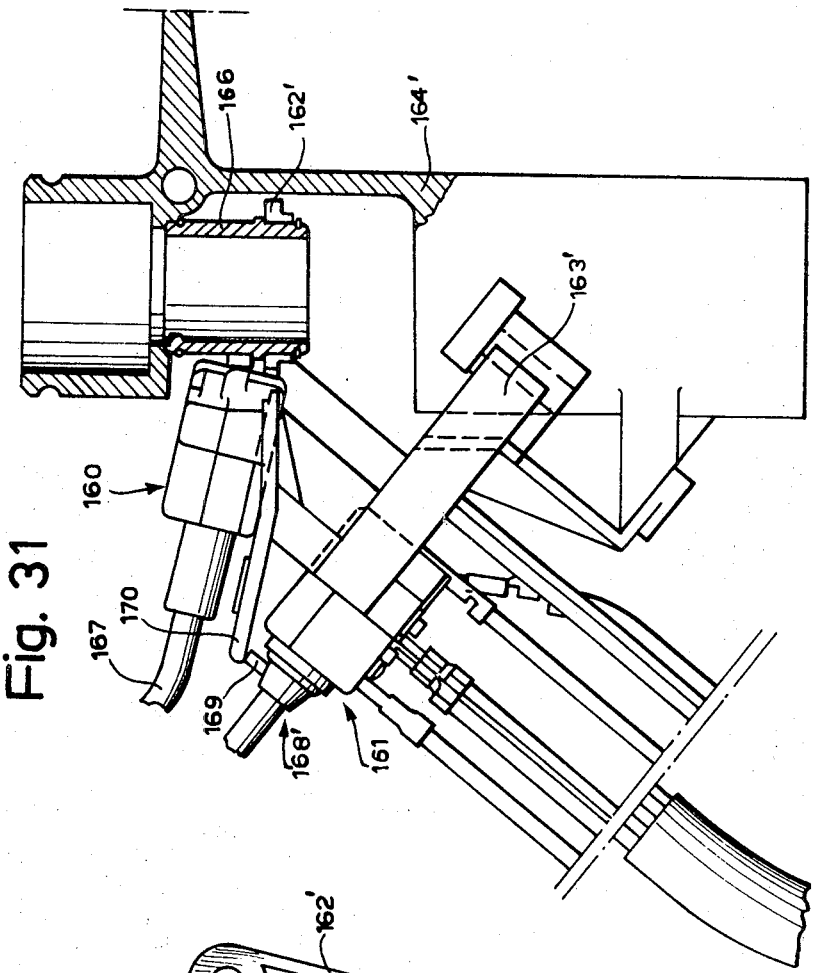
FIG. 31 is a part-sectional elevational view of a modified form of the embodiment of FIG. 29.
Figure 32:
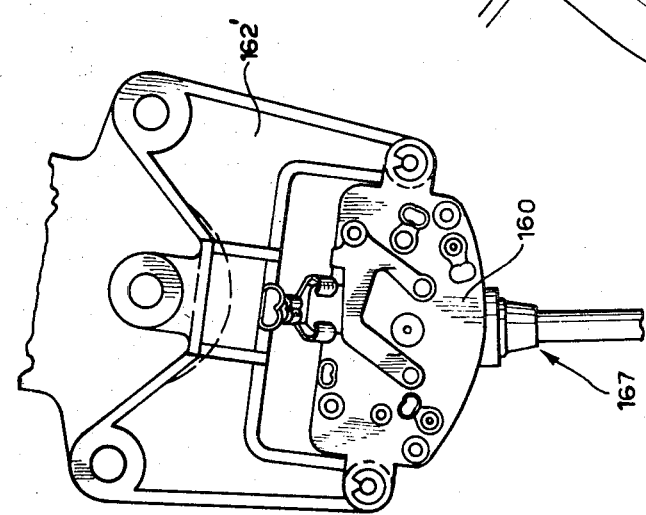
FIG. 32 is a partly sectioned top plan view of the apparatus shown in FIG. 31.
Figure 35:
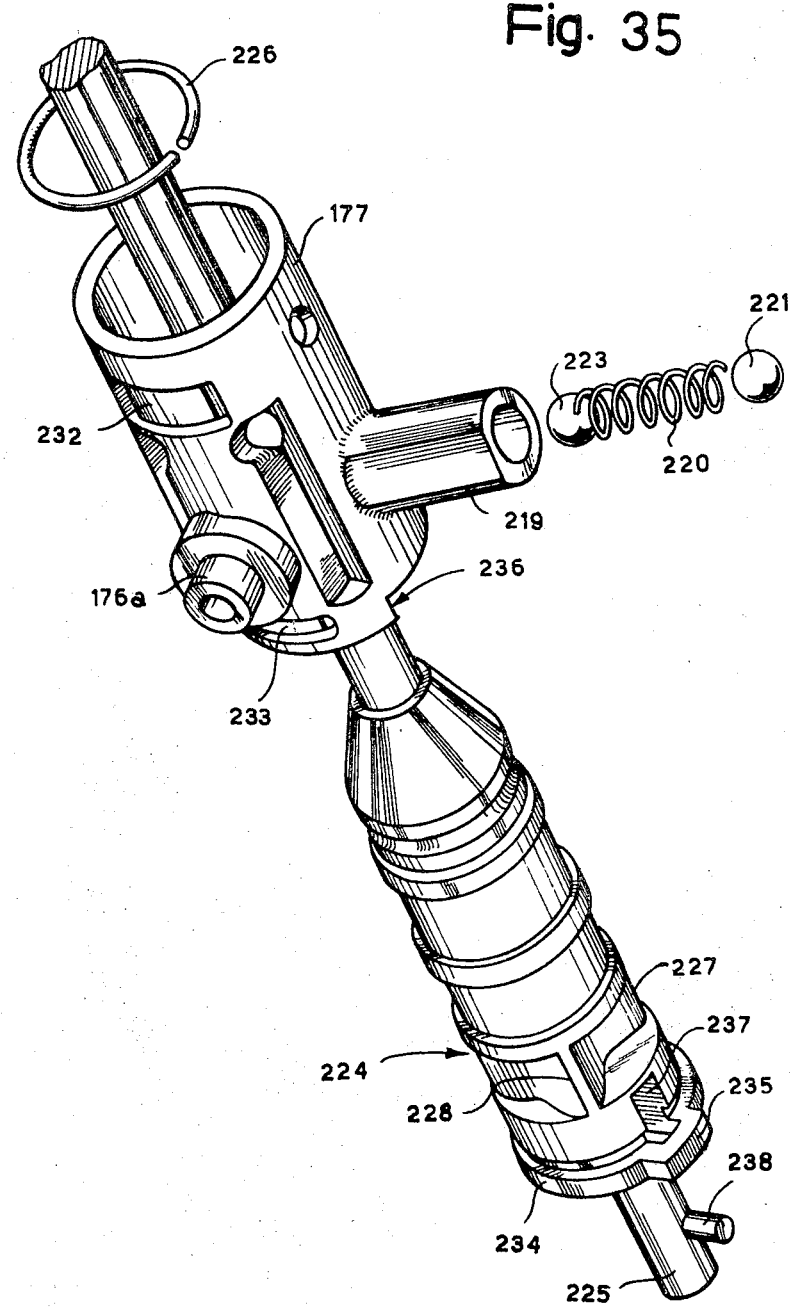
FIG. 35 is an exploded perspective view on an enlarged scale of part of the operating lever of the main light switching unit of FIG. 34.
Figure 38:
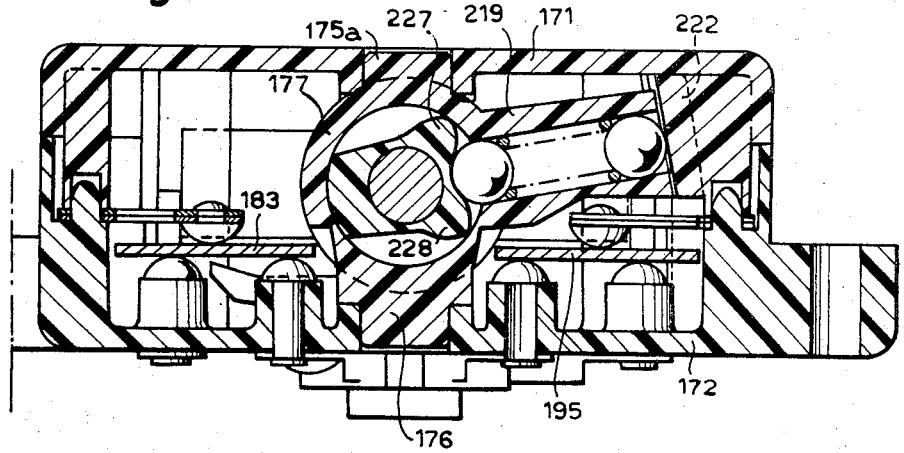
FIG. 38 is a cross-sectional view on line XXXVIII—XXXVIII of FIG. 36.

In the modification shown in FIGS. 31, 32 and 33 the two units 160, 161 instead of being directly superposed, are arranged in a staggered relationship and are inclined at different angles to the steering column, being supported by shaped supporting members 162', 163' secured to a central member 164'. The operating lever 168' of the lower unit 161 is capable of rocking movement in a plane containing its transverse rotational axis and is provided with an upwardly projecting nose 169 which co-operates with a spring contact 170 arranged externally of the unit 161 for operating a further switch.

Figure 30:
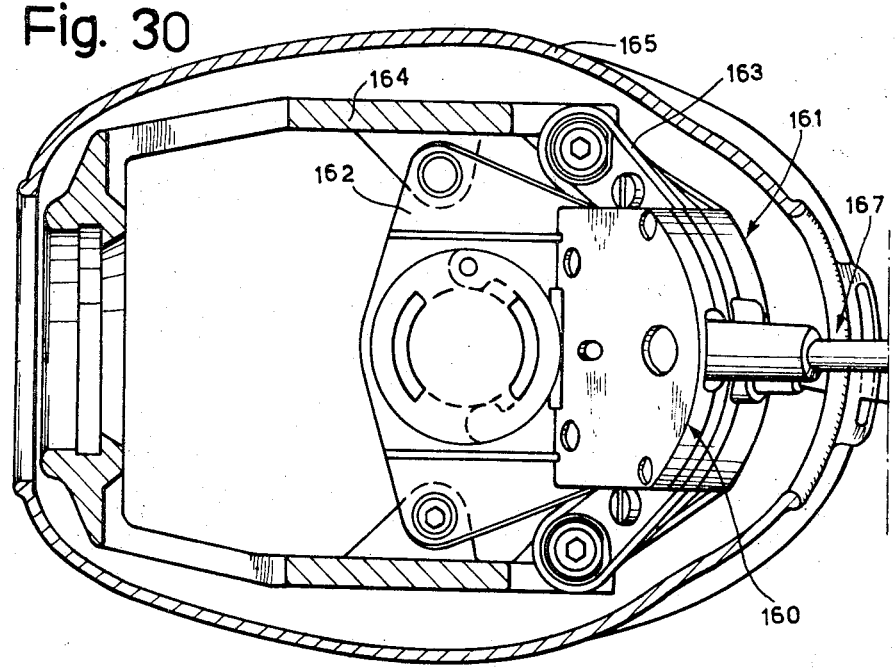
FIG. 30 is a partial top plan view of the apparatus of FIG. 29.

In the embodiment of FIGS. 29, 30 and the embodiment of FIGS. 31–33, the unit 160 for operating the direction indicators is similar to the unit 28 previously described with reference to FIGS. 1 to 22 and cooperates with a tubular member 166 rotatable with the steering shaft and equivalent to the tubular member 15 of the unit 28.

As shown in FIGS. 34 to 42 the unit 161 for controlling switching of the main lights is provided with an operating lever 168 which is capable of rocking movement about a transverse axis, is rotatable about its own longitudinal axis and is also axially displaceable along the said longitudinal axis. The unit 161 is enclosed by two hollow symmetrical shells 171 and 172 moulded from plastics and interconnected by rivets accommodated by seatings 173 and 173a in the two shells. The bottom shell 172 is provided with two lateral extensions 174 for attachment to the supporting member 163 (or 163') for the unit. The two shells 171, 172 are formed centrally with circular openings 175, 176 engaging two opposite pins 175a and 176a of an outer tubular member 177 forming part of the operating lever 168, and extending outwardly through two slots 178, 179 provided in the external walls of the shells 171, 172.

Two triplets of fixed hemispherical contacts 180, 181, 182; 192, 193, 194 are arranged in the bottom shell 172 on either side of the respective central opening 176. Two respective oscillatory discs 183, 195, acting as movable contacts, are engaged centrally by respective spherical contacts 185, 197 carried by longer arms of respective spring members 184, 196 of V-shape which urge the discs 183, 195 into selective engagement with the respective fixed contacts. The spring members 184, 196 are secured to the bottom shell, 172, by rivets 187 and 199 engaged in holes 186, 198 arranged at the apex of the respective members 184, 196 and inserted into seatings 188, 200 in the bottom shell 172. The shorter arms of the V-shaped spring members 184, 196 are formed with holes 189, 201, adapted to be engaged by two pins 190, 202 on the bottom shell 172. Respective tubular projections 191, 203 carried by the top shell 171 mate with the pins 190, 202 of the unit 161.

Two pairs of co-operating projections 204, 206 and 205, 207 extend from the internal faces of the two shells 171, 172 and are formed with slots for receiving a leaf-spring 208. The leaf-spring 208 co-operates with a spring strip 209 secured by one end to the lateral edge of the bottom shell 172 by a rivet 210, and carrying at its free end a silver contact 211 adapted to co-operate with a stationary contact 212.

Three pairs of guide members 213, 214, 215 are formed internally on the bottom shell 172 and accommodate three respective swing levers 216, 217, 218 respectively, two of which (216, 217) are arranged on the same side of the central opening 176 in the shell 172 and the third of which (218) is arranged on the opposite side of said opening 176.

As mentioned above, the operating lever 168 includes an outer tubular member 177 which upon assembly of the unit is pivotally secured by its opposite transverse pins 175a and 176a; this tubular member 177 is provided with a radial extension 219 formed with an internal through bore accommodating inner and outer balls 221, 222 respectively between which a helical spring 220 is compressed. The outer ball 221 co-operates with a positioning rack 222 (FIGS. 34 and 42) carried by the top shell 171 and formed with two adjacent hollows 222a, 222b, which are adapted to be engaged selectively by the ball 221 in order to retain the lever 168 in two different operative positions when the lever 168 is rocked about its transverse rotational axis.

An inner tubular member 224 is rotatably mounted coaxially within the outer tubular member 177 and is provided externally at one end with a retaining split ring 226. The tubular member 224 accommodates a co-axial metal rod 225 which acts as a handle and which is capable of rotation and axial displacement relative to the tubular member 177. The rod 225 carries at its free end an operating knob 225a (FIG. 34).

The inner tubular member 224 is formed centrally with an external cam profile comprising two shaped projections 227, 228 (FIG. 38) alternating with notches adapted to co-operate with the inner ball 223 in order to retain the inner tubular member 224 in three different angular positions when the rod 25 is rotated about its longitudinal axis.

The rotatable inner tubular member 224 is formed with three depressed axially spaced apart cam profile regions 229, 230, 231 arranged to co-operate with the three swing levers 216, 217, 218 respectively. The swing levers contact the cam profile regions through two openings 232 and 233 cut in the outer tubular member 177.

An annular flange 234 is provided at the axially inner end of the inner tubular member 224 and abuts the axially inner end of the outer member 177. The flange 234 is provided with an outwardly extending tooth 235 adapted to co-operate with a circumferentially extending notch 236 in the outer member 177 in order to limit rotation of the inner tubular member 224 with respect to the outer tubular member 177. An axially extending slot 237 is cut in the inner tubular member 224 at the tooth 235 and receives a radially extending pin 238 attached to the rod 225.

A protective cover plate 239 is fitted on the axially inner end of the rod 225 and is adapted to engage the spring plate 208 when the rod 225 is displaced axially inwardly.

Two thread-guides 240, 241 are secured to the rear and lower portions of the bottom shell 172.

Figure 40:
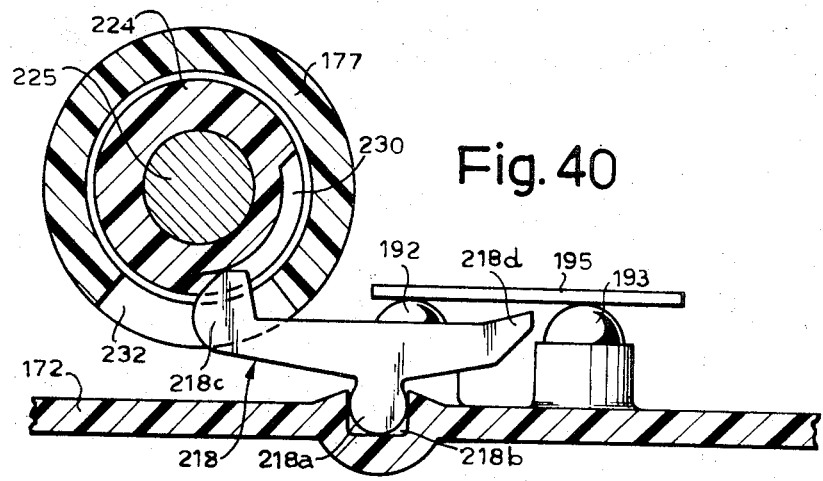
FIGS. 40 and 41 are two cross-sectional views similar to FIG. 39 but to a larger scale showing two operative positions of the unit of FIGS. 36 to 39.
Figure 42:
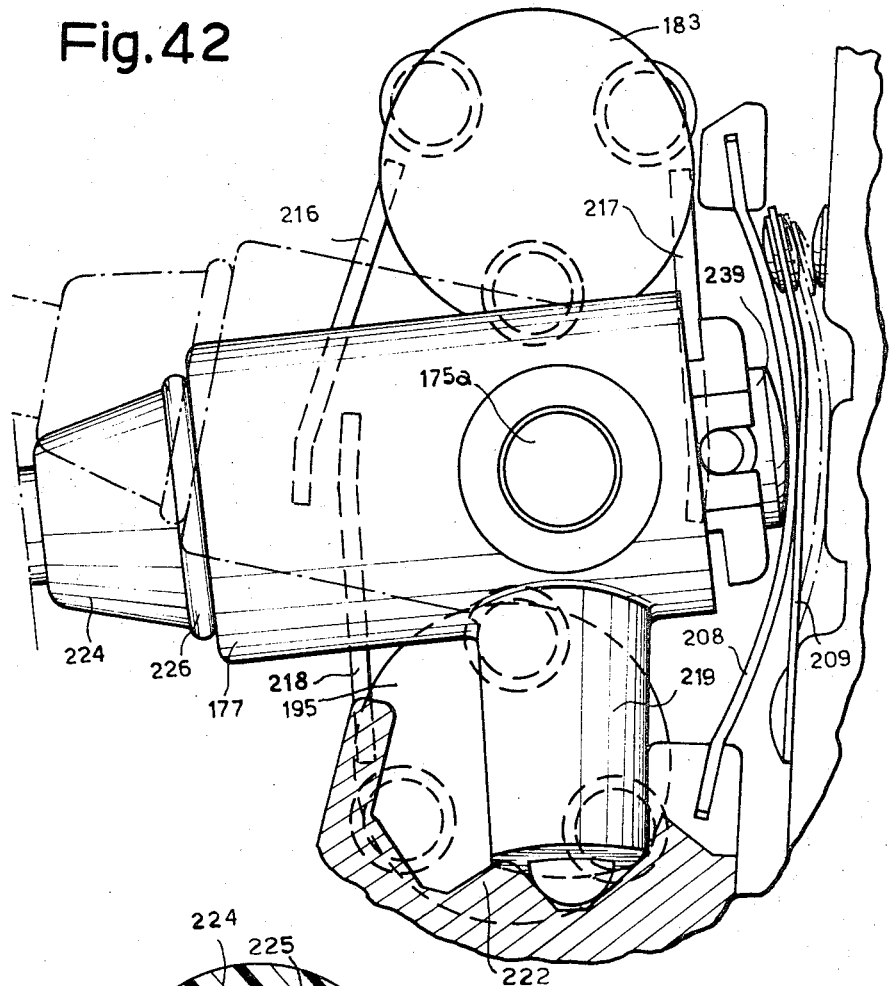
FIG. 42 is a diagrammatic plan view on an enlarged scale of a detail of the unit of FIG. 36 showing the operative features of said unit.
Figure 41:
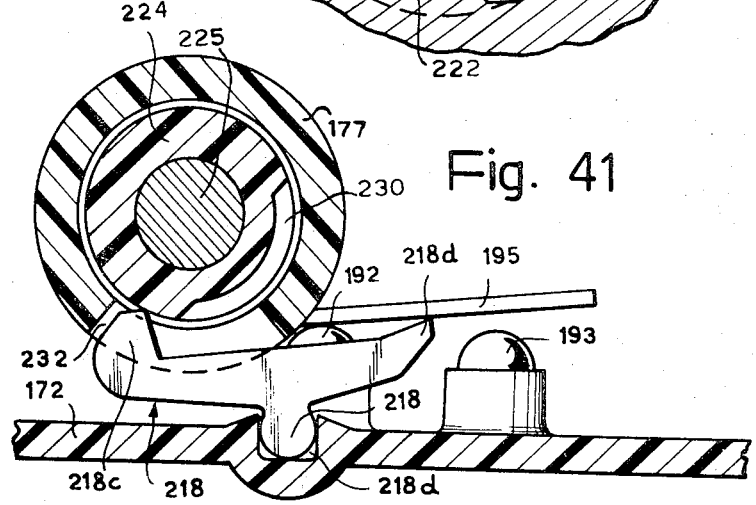

The swing levers 216, 217, 218 are each centrally provided with a bottom projection 216a, 217a, 218a, which is accommodated in a respective recess in the bottom shell 172 such as the recess 218b in FIGS. 40, 41. An upwardly projecting nose 216c, 217c, 218c, provided at one end of each swing lever 216, 217, 218 co-operates with one of the cam profile regions 229, 230, 231 respectively of the inner tubular member 224. The opposite ends 216d, 217d of the swing levers 216, 217 co-operate with the disc 183 and the opposite end of the swing lever 218 co-operates with the disc 195 to tilt said discs selectively and cause them to inter-connect electrically in different operative positions selected pairs of the contacts 180, 181, 182 and 192, 193, 194 on which they bear.

Figure 39:
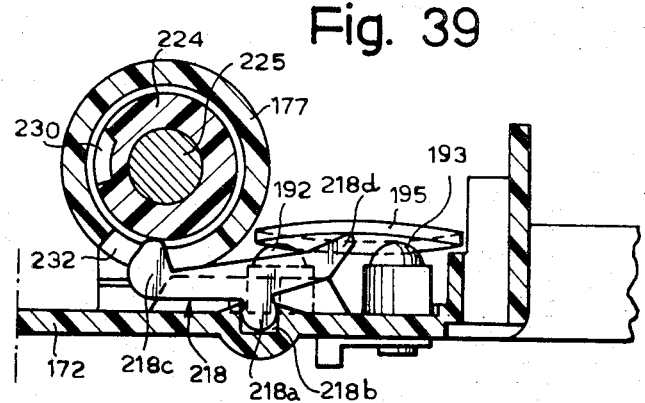

Since the operating lever 168 is capable of rocking bodily about its transverse axis, and the inner tubular member 224 is rotatable about the longitudinal axis of the lever 168, the swing levers 216, 217, 218 may be oscillated about their respective bottom projections 216a, 217a, 218a either by rotating the said member 224 as shown in FIG. 39, or by rocking the lever 168 bodily about its transverse axis as shown in FIGS. 40 and 41.

When the respective nose 216c, 217c, 218c of a lever 216, 217, 218 upon a large diameter cylindrical portion of its associated cam profile region 229, 230, 231 (FIGS. 39, 41) the swing lever 216, 217, 218 is inclined so that its respective opposite end 216d, 217d, 218d moves away from the bottom shell 172 and tilts the associated disc 183, 195. When, however, the respective nose 216c, 217c, 218c, bears upon a depressed portion of one of the associated cam profile regions 229, 230, 231 the respective lever 216, 217, 218 assumes as substantially horizontal position and is released from contact with the associated disc 183, 195, which is then restored automatically to its inoperative position by the effect of the respective spring member 184, 196.

When the rod 225 of the operating lever 168 is displaced axially inward with respect to the tubular members 177, 224, the cover plate 239 bends the spring plate 209 against the action of the restoring leaf-spring 208 and causes the contact 211 to close on to the stationary contact 212, whereby a headlight circuit of on the vehicle is completed to effect flashing of the head lights.

With the above described apparatus a large number of different switching operations can be performed selectively by properly combining the angular displacements of the rotatable inner tubular member 224 of the lever 168 about the longitudinal axis of the lever with bodily rocking movement of the lever 168 about its transverse axis, thereby dispensing with the need for separate switches as employed in conventional vehicle electrical circuits.

FIGS. 43 to 49 show apparatus according to a further modification, more particularly suitable for tractor and trailer units, for operating the lights and/or direction indicators on both the tractor and trailer simultaneously. With this apparatus a further electrical device on the vehicle, such, for example, as a multiple speed windscreen wiper motor, can be controlled.

Figure 43:
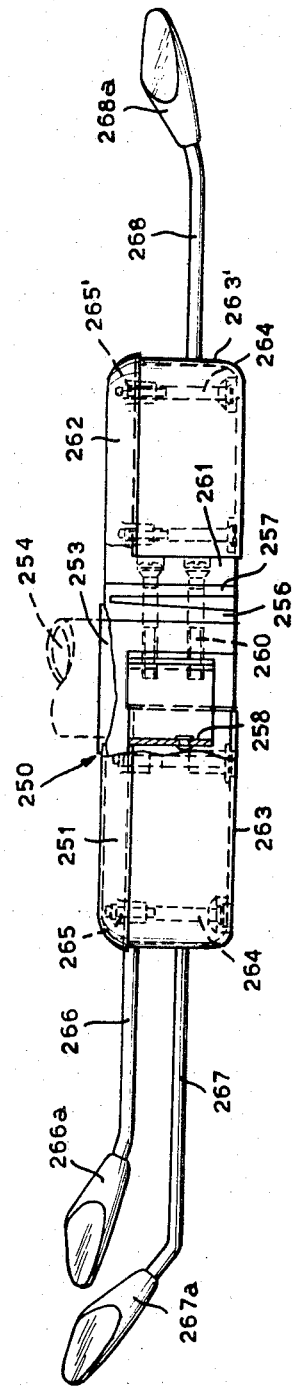
FIG. 43 is a part-sectional side elevational view of switching control apparatus according to a further embodiment of the invention.
Figure 44:
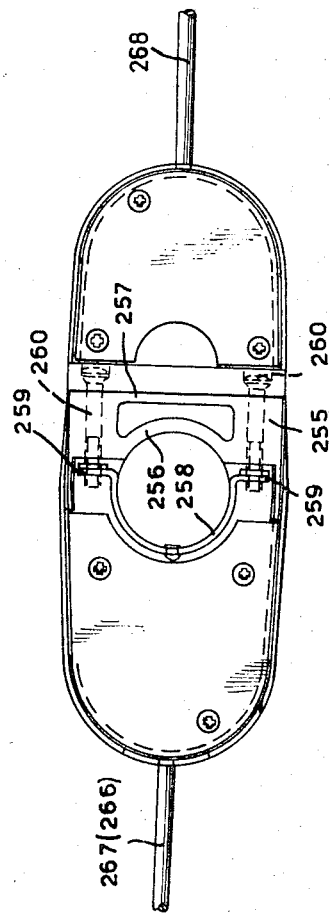
FIG. 44 is a bottom plan view of the apparatus of FIG. 43.

Referring to FIGS. 43 and 44 a supporting member 250, preferably of cast metal, is provided with a radial extension 251 laterally extending from a bored portion 253 which is coaxially mounted upon a stationary steering column 254, shown in broken outline.

The supporting member 250 is provided opposite the radial extension 251 with a shaped portion 255 extending downwardly (i.e. parallel to the steering column axis) and having a curved wall 256 which is juxtaposed to the steering column 254 and an opposite planar wall 257 which faces outwardly away from the steering column 254.

The portion 255 serves for attachment of the supporting member 250 to the steering column 254 by means of a part-circular strap 258 having outwardly extending lugs 259 formed with screw-threaded holes in which fixed screws 260 extending through holes in the portion 255 engage. The heads of the screws 260 are engaged by a further supporting member 261 provided with a radial extension 262 which is arranged symmetrically with respect to the extension 251. Thus the various parts of the supporting member 250 are held together and at the same time firmly attached to be steering column 254 by the screws 260.

Two hollow casings 263, 263' are fitted from below to the extensions 251, 262 and are secured thereto by means of screws 264, 264' screwed into respective tapped bushings 265, 265' affixed to the said extensions 251, 262. The casing 263 encloses in a superposed relationship two switching units controlling respectively the direction indicators and main lights for both the tractor and trailer. The other casing 263' encloses one switching unit for controlling the mode of operation (for example, continuous or intermittent) of the windscreen wiper of the tractor.

The three operating units are substantially similar to one another, so that one only will be described for the sake of conciseness, having reference to FIGS. 45 to 49.

Each unit comprises a base 269 (FIG. 48) of insulating material formed with through holes 270, 271 for the interconnection of two superposed units, or for the connection of the unit to the respective outer casing 263 or 263'. The base 269 is also formed with a through bore 272 accommodating a transverse pin 263 extending along an axis parallel to the axis of the steering column 254 and having mounted thereon the operating lever or respective operating levers for the unit or respective units arranged in the respective casing. In FIGS. 45 to 49 the casing 263, housing two superposed units, is shown.

The base 269 comprises an upraised edge portion 274 formed with a plurality of shaped inwardly facing recesses 275 (FIG. 48) acting as a positioning rack co-operating with a positioning member carried by the respective operating lever, as explained hereafter, in order to retain the lever resiliently in different operative positions.

Two triplets of holes 276 are provided on the base 269 on either side of the upraised portion 274 and accommodate respectively part-spherical fixed contacts 277. Each triplet of contacts 277 has an oscillatory metal disc 278 bearing thereon. The disc 278, which acts as a movable contact, is urged towards the fixed contacts by a retaining spring member of V-shape attached by means of a rivet 280 engaged in a hole 281 in the base 259 and engaged by a ferrule 282 on the base. The spring member has a longer arm 279 which carries an end contact 283 acting centrally on the respective disc 278.

By the oscillation of each disc 278 different pairs of fixed contacts of the respective triplet may be interconnected electrically to effect the desired switching functions.

The or each respective operating lever mounted on the transverse pin 273 comprises a moulding of plastics 284 (FIG. 49) having an enlarged central portion 285 formed with a through bore 286 which receives the pin 273. The central portion 285 is also formed with a radial extension 287 having an operating rod 266 (or 267 or 268) embedded therein and carrying at its outer end a handle 266a (or 267a, or 268a). A radial extension 288 opposite the extension 287 is formed with a radially extending bore 289 in the wall of which longitudinally extending diametrically opposite grooves 290 are formed. The bore 289 accommodates a slidable piston 292 which is urged radially outwardly by a helical spring 291 and is provided with longitudinal ribs 293 adapted to slide in respective said grooves 290 to prevent rotation of the piston 292 in the bore 289.

The piston 292 is provided at its radially outer end with two pairs of pointed projections 294 which embrace respective oppositely extending pins 295 formed on a roller 296 so that the latter is rotatably mounted in the radially outer end of the piston 292. The roller 296 is adapted to co-operate with the recesses 275 in the positioning rack, constituted by the respective edge portion 274.

The central portion 285 of the lever is provided on its lower face with two diametrically opposed dog teeth 297. The dog teeth 297 acts as a clutch and engage in corresponding recesses 301 in an auxiliary member 298.

The auxiliary member 298 has a cylindrical middle portion 299 formed with a central through hole 300 with which the recesses 301 communicate at diametrically opposite positions. Two symmetrical projections 302, each carrying two cylindrical seating bores 303 extend radially from the middle portion 299. The seating bores 303 each carry a respective ball 304 which rolls on the respective base 269. One or other of the balls 304 carried by a respective projection 302 engages selectively in a respective depression 305 in the base 269.

When the lever rocked bodily in either direction about the axis of the pin 273, the balls 304 are moved over the base 269 along respective arcuate tracks and on encountering the respective depressions 305 one of the balls of each projection 302 enters the depression 305, causing the associated disc 278 to be inclined so as to engage a selected pair of the respective triplet of fixed contacts 277 for effecting a specific electrical switching operation.

With the case of 263, which encloses two operating units, a single transverse pin 273 provides a common pivot axis for the two operating rods 266, 267, of the two units.

The switching unit for the direction indicators is in this embodiment not provided with means for automatic release.

What is claimed is:

1. Switching control apparatus for the direction indicators and main lights of a vehicle, comprising a main support adapted to be attached to a stationary part of a vehicle steering column and including at least two pre-assembled switching units controlling the direction indicators and the main lights respectively, each unit having a respective operating lever extending laterally outwardly from and on the same side of the support, at least one of said switching units including a conductive disc-shaped movable contact medber, a contoured track, at least two rolling elements adapted to roll on said track, means urging the movable contact member resiliently into contact with said rolling elements, means controlling the relative position of the track and the rolling elements in accordance with the position of the respective operating lever to tilt said disc-shaped contact member at different respective angles for different operative positions of the lever, and a plurality of fixed contacts adapted to be connected to vehicle circuits to be controlled and arranged in juxtaposition to the movable contact member to cause respective said circuits to be completed through the movable contact member in the different respective operative positions of the lever.

2. Apparatus as claimed in claim 1, in which the track is fixed within the casing and the operating lever has an extension in which the rolling elements are trapped for movement with said lever over the track.

3. Apparatus as claimed in claim 1 in which the said means urging the disc-shaped contact member into contact with the rolling elements comprise a spring acting centrally on said disc-shaped contact member.

4. Switching control apparatus for the direction indicators and main lights of a vehicle, comprising a main support adapted to be attached to a stationary part of a vehicle steering column and including at least two pre-assembled switching units controlling the direction indicators and the main lights respectively, each unit having a respective operating lever extending laterally outwardly from and on the same side of the support, at least one of the switching units having a pre-assembled casing comprising two molded plastic shells and transverse rivets securing the shells together, one of the shells being provided with means of attachement of the unit to the support, the operating lever of the main light switching unit being mounted for rocking movement without a transverse axis and being additionally mounted for rotation about its longitudinal axis and for displacement along said longitudinal axis, respective switching contacts being provided for operation by such respective rocking movement, rotation and axial displacement of the operating lever; the main lights switching unit further including two-disc-shaped movable contacts and respective sets of fixed contacts on which said movable contacts bear, and the respective operating comprises inner and outer coaxial tubular members, the outer member being rotatable about a fixed pivot axis and the inner member being rotatable around its longitudinal axis, cam profile regions formed on the external surface of the inner tubular member and respective cam-following swing levers pivotally mounted in the casing and engaging said cam profile regions to effect tilting of the disc-shaped movable contacts to interconnect electrically different respective pairs of said fixed contacts in accordance with the tilting of the movable contacts as controlled selectively by pivotal movement of the outer tubular member and rotation of the inner tubular member.

5. Apparatus as claimed in claim 4, including positioning means effective to retain the outer tubular member resiliently in selected angular positions with respect to said fixed pivot axis and also effective to retain the inner tubular member resiliently in different predetermined angular positions of rotation about its longitudinal axis.

6. Apparatus as claimed in claim 5, in which said positioning means comprise a tubular radial extension on the outer tubular member, two balls located within said radial extension, spring means urging said balls apart, a shaped region on the outer surface of the inner tubular member and a fixed positioning rack mounted within the casing, the radially inner ball bearing against the shaped region and the outer ball bearing against the positioning rack.

7. Apparatus as claimed in claim 4 including a rod mounted coaxially within the inner tubular member for displacement axially, and means keying the rod to the inner tubular member for rotation therewith.

8. Apparatus as claimed in claim 7, including normally-open electrical contacts asociated with the rod and arranged to be closed upon axial displacement of the rod inwardly a biasing spring in the casing urging the rod axially outwardly.

9. Apparatus as claimed in claim 4, in which the inner tubular member is provided with a radial extension and a co-operating sector-shaped slot is provided in the outer tubular member to limit the rotation of the inner member about its longitudinal axis.

10. Apparatus as claimed in claim 4, in which respective pairs of projections and associated recesses therebetween are formed internally on one of the shells, and guide respective said swing levers, each said lever having a central bottom projection which engages in respective said recess to permit pivotal movement of the lever, and being arranged to engage a respective said cam profile region at one end and a face of a said disc-shaped movable contact at the other end, the outer tubular member having respective openings permitting access of the respective levers to the said cam profile regions.

11. Switching control apparatus for the direction indicators and main lights of a vehicle, comprising a main support adapted to be attached to a stationary part of a vehicle steering column and including at least two pre-assembled switching units controlling the direction indicators and the main lights respectively, each unit having a respective operating lever extending laterally outwardly and on the same side of the support, each switching unit comprising an insulating base, a positioning rack supported on the base, a positioning member carried by the respective operating lever of the unit, spring means urging the positioning member into engagement with said rack, two sets of fixed contacts arranged on each side of said positioning rack, two respective disc-shaped movable contacts bearing resiliently upon each set of fixed contacts, two contoured tracks and respective pairs of base movable over respective said track by rocking movement of the operating lever to cause the respective movable contacts to effect electrical connections between different respective pairs of said fixed contacts for different respective operative positions of the lever as determined by the positioning rack.

12. Apparatus as claim in claim 11, including a separate moulded portion having two respective extensions in which the respective pairs of balls are retained, and dog clutch means connecting said moulded portion with the operating lever.

13. Apparatus as claimed in claim 11 in which the lever has a radial extension housing the spring-urged postioning member, the latter comprising a piston mounted for sliding movement in said radial extension and a rotatable roller carried at the outer end of the piston and co-operating with said positioning track.

References Cited

UNITED STATES PATENTS

| | | |
|---|---|---|
| 2,453,035 | 11/1948 | Ponsy. |
| 3,153,131 | 10/1964 | Gratzmuller. |

FOREIGN PATENTS

| | | |
|---|---|---|
| 524,452 | 5/1954 | Belgium. |
| 1,327,259 | 4/1963 | France. |
| 1,341,185 | 9/1963 | France. |
| 1,385,748 | 12/1964 | France. |
| 1,399,439 | 4/1965 | France. |
| 1,008,133 | 5/1957 | Germany. |
| 1,037,886 | 8/1958 | Germany. |
| 1,119,699 | 12/1961 | Germany. |
| 547,982 | 9/1956 | Italy. |
| 550,315 | 10/1956 | Italy. |
| 556,354 | 2/1957 | Italy. |

ROBERT K. SCHAEFER, Primary Examiner

R. A. VANDERHYE, Assistant Examiner

U.S. Cl. X.R.

200—6, 61.27, 166